(12) United States Patent
Akita et al.

(10) Patent No.: US 11,887,090 B2
(45) Date of Patent: Jan. 30, 2024

(54) SELF-PAYMENT SYSTEM, MANAGEMENT APPARATUS, AND TERMINAL MANAGEMENT METHOD

(71) Applicant: FUJITSU FRONTECH LIMITED, Tokyo (JP)

(72) Inventors: Shigekazu Akita, Inagi (JP); Ichiro Yamamoto, Inagi (JP)

(73) Assignee: FUJITSU FRONTECH LIMITED, Inagi (JP)

( * ) Notice: Subject to any disclaimer, the term of this patent is extended or adjusted under 35 U.S.C. 154(b) by 100 days.

(21) Appl. No.: 17/379,558

(22) Filed: Jul. 19, 2021

(65) Prior Publication Data

US 2021/0350349 A1 Nov. 11, 2021

Related U.S. Application Data

(63) Continuation of application No. PCT/JP2019/003458, filed on Jan. 31, 2019.

(51) Int. Cl.
*G06Q 20/18* (2012.01)
*G06Q 20/20* (2012.01)
*G07D 11/20* (2019.01)

(52) U.S. Cl.
CPC ........... *G06Q 20/18* (2013.01); *G06Q 20/208* (2013.01); *G07D 11/20* (2019.01)

(58) Field of Classification Search
CPC .............................. G06Q 20/18; G06Q 20/208
See application file for complete search history.

(56) References Cited

U.S. PATENT DOCUMENTS 10,492,106 B1 * 11/2019 Yoo ........................ H04W 24/02

FOREIGN PATENT DOCUMENTS

JP 2008077481 A 4/2008
JP 2011076298 A 4/2011
(Continued)

OTHER PUBLICATIONS

Office action issued in corresponding Japanese patent application No. 2020-569293, dated Mar. 8, 2022.
(Continued)

*Primary Examiner* — Peter Ludwig
(74) *Attorney, Agent, or Firm* — Greer Burns & Crain Ltd.

(57) ABSTRACT

A management apparatus capable of reducing troubles with cash operations to be performed by store clerks and decreasing the costs for store operations is provided. A self-payment system includes a scanning station, a payment station, and a management server. The payment station includes a money-insertion acceptance unit for accepting insertion of cash upon payment for a product to be purchased that has been registered on the basis of the scanning station, and a money-ejection acceptance unit for accepting ejection of cash on the basis of a manipulation performed by a customer on the payment station. The management server includes a cash amount determination unit for determining the amount of cash within the payment station, and a cash processing restriction unit for restricting money-insertion acceptance by the money-insertion acceptance unit of the payment station or money-ejection acceptance by the money-ejection acceptance unit of the payment station in accordance with the amount of cash determined by the cash amount determination unit.

7 Claims, 23 Drawing Sheets

(56) References Cited

FOREIGN PATENT DOCUMENTS

| | | |
|---|---|---|
| JP | 2012003561 A | 1/2012 |
| JP | 2016119093 A | 6/2016 |
| JP | 6037079 B2 | 11/2016 |
| JP | 2016189139 A | 11/2016 |
| WO | WO 2000/025282 * | 4/2000 |

OTHER PUBLICATIONS

ISR issued in PCT/JP2019/003458, dated Mar. 19, 2019.
Written opinion of the ISR issued in PCT/JP2019/003458, dated Mar. 19, 2019 (partial translation).
Office action issued in corresponding Korean patent application No. 10-2021-7022292, dated Nov. 1, 2023.

* cited by examiner

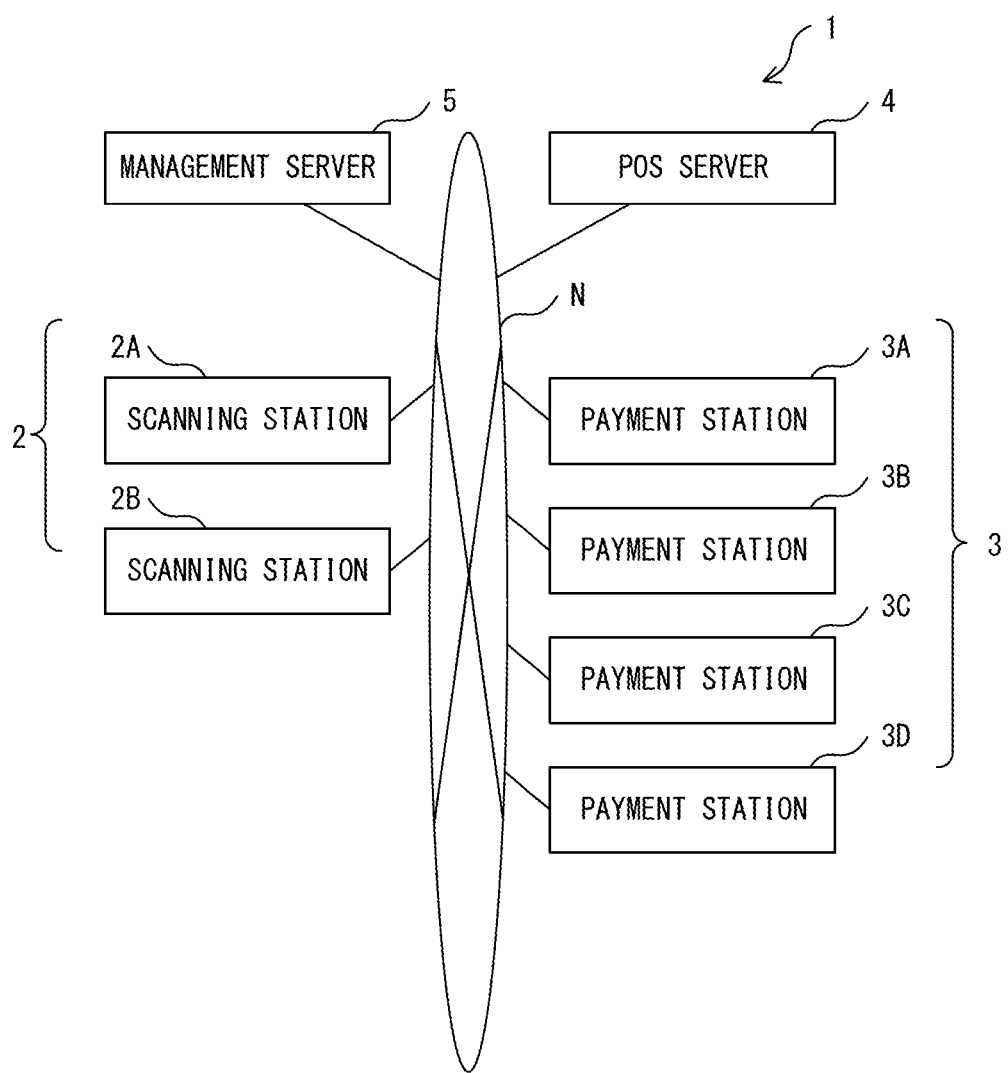
F I G. 1

| PS NUMBER | NUMBER OF 10,000-YEN BILLS | NUMBER OF 5,000-YEN BILLS | NUMBER OF 1,000-YEN BILLS | NUMBER OF 500-YEN COINS | NUMBER OF 100-YEN COINS | NUMBER OF 50-YEN COINS | NUMBER OF 10-YEN COINS | NUMBER OF 5-YEN COINS | NUMBER OF 1-YEN COINS | CO FLAG | S FLAG | T FLAG |
|---|---|---|---|---|---|---|---|---|---|---|---|---|
| 1 | 200 | 200 | 200 | 100 | 100 | 100 | 100 | 100 | 100 | 1 | 0 | 1 |
| 2 | 2 | 156 | 89 | 56 | 31 | 69 | 95 | 76 | 35 | 0 | 1 | 1 |
| 3 | 152 | 68 | 84 | 96 | 25 | 66 | 42 | 32 | 21 | 1 | 1 | 1 |
| 4 | 100 | 55 | 60 | 43 | 89 | 20 | 32 | 18 | 66 | 1 | 1 | 0 |
| ... | ... | ... | ... | ... | ... | ... | ... | ... | ... | ... | ... | ... |
| n |  |  |  |  |  |  |  |  |  |  |  |  |

| | NUMBER OF 10,000-YEN BILLS | NUMBER OF 5,000-YEN BILLS | NUMBER OF 1,000-YEN BILLS | NUMBER OF 500-YEN COINS | NUMBER OF 100-YEN COINS | NUMBER OF 50-YEN COINS | NUMBER OF 10-YEN COINS | NUMBER OF 5-YEN COINS | NUMBER OF 1-YEN COINS |
|---|---|---|---|---|---|---|---|---|---|
| CASH-OUT THRESHOLD | 2 | 2 | 9 | 1 | 9 | 2 | 9 | 2 | 9 |
| PAYMENT THRESHOLD | 200 | 200 | 200 | 100 | 100 | 100 | 100 | 100 | 100 |

110

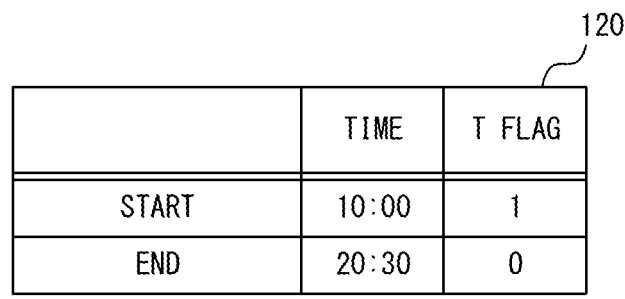
F I G. 5

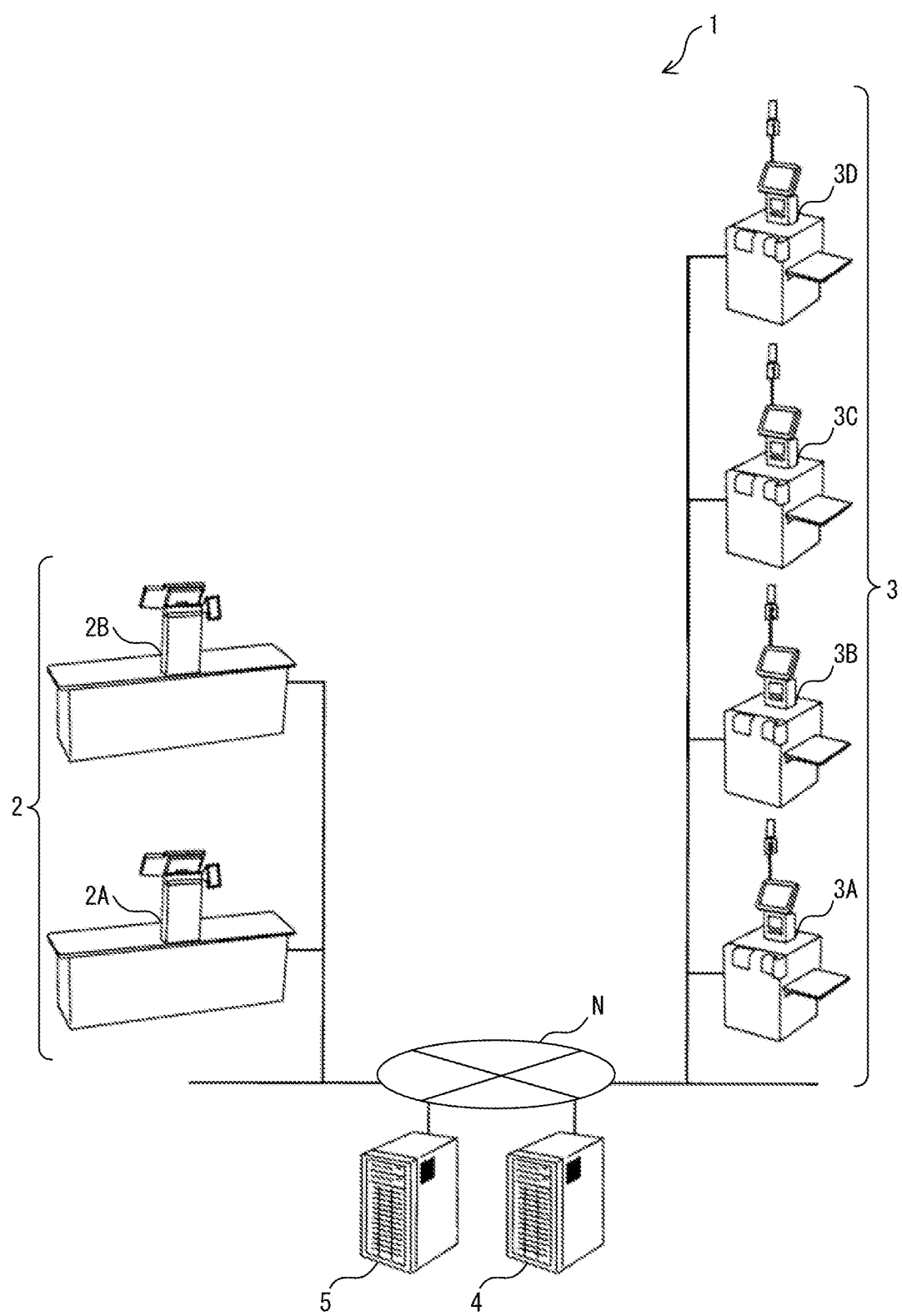
F I G. 6

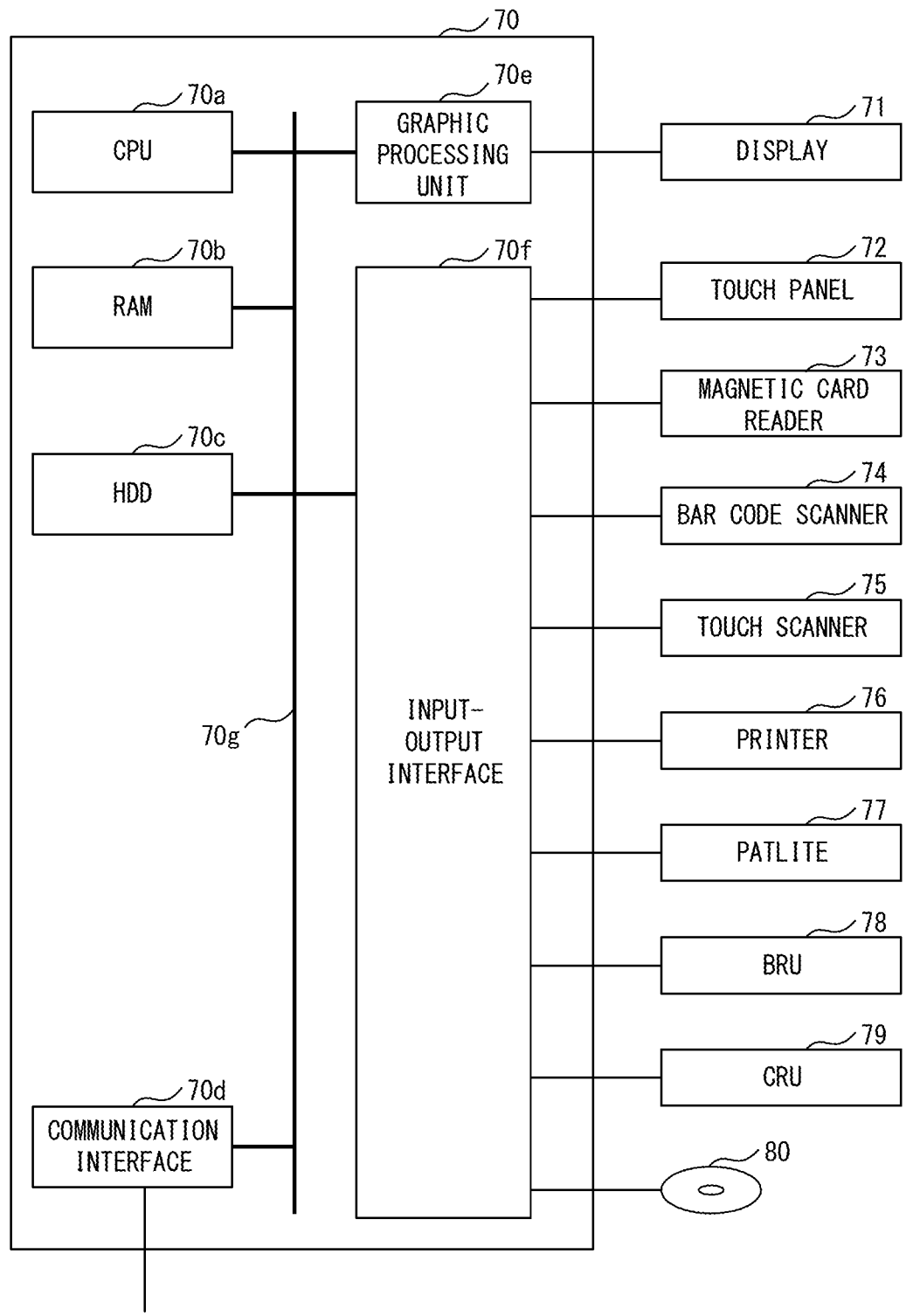
F I G. 9

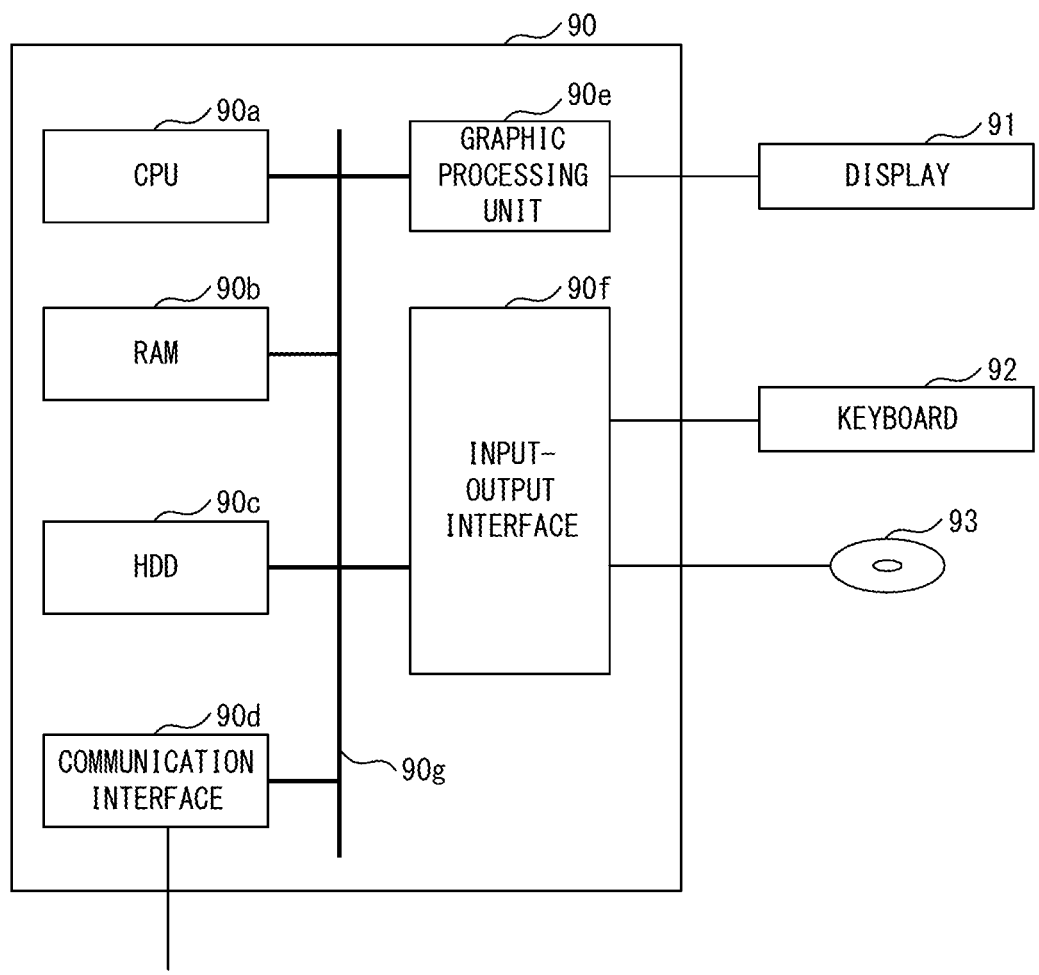
F I G. 10

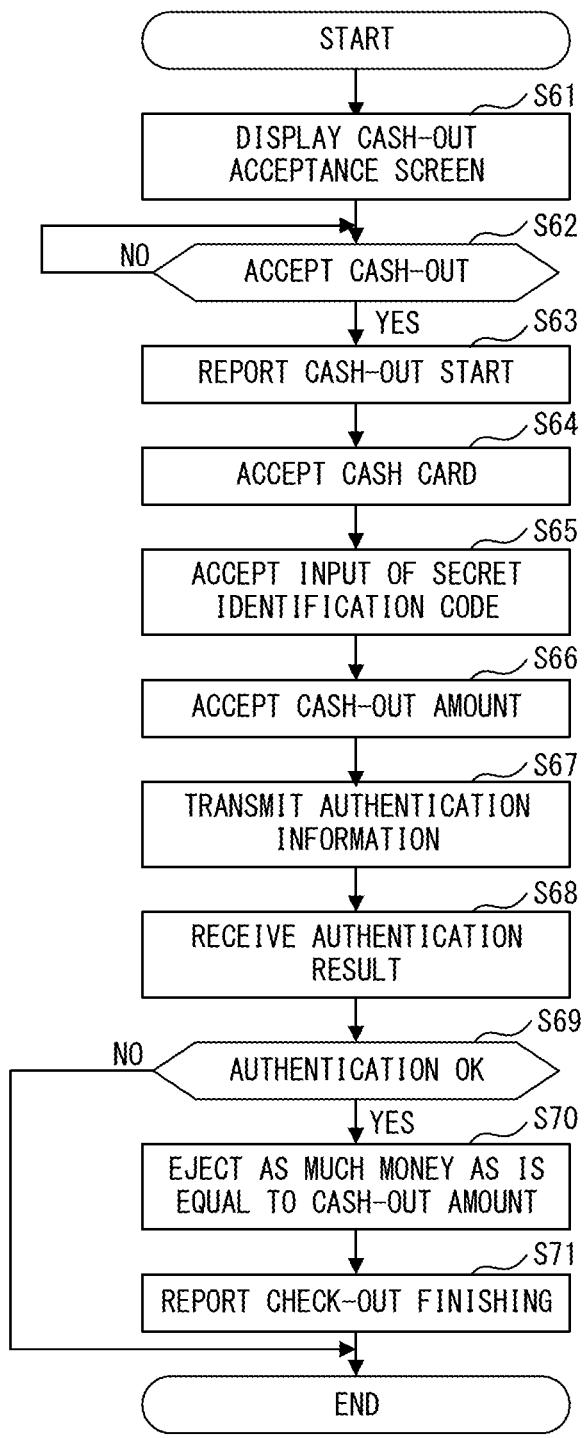
F I G. 1 6

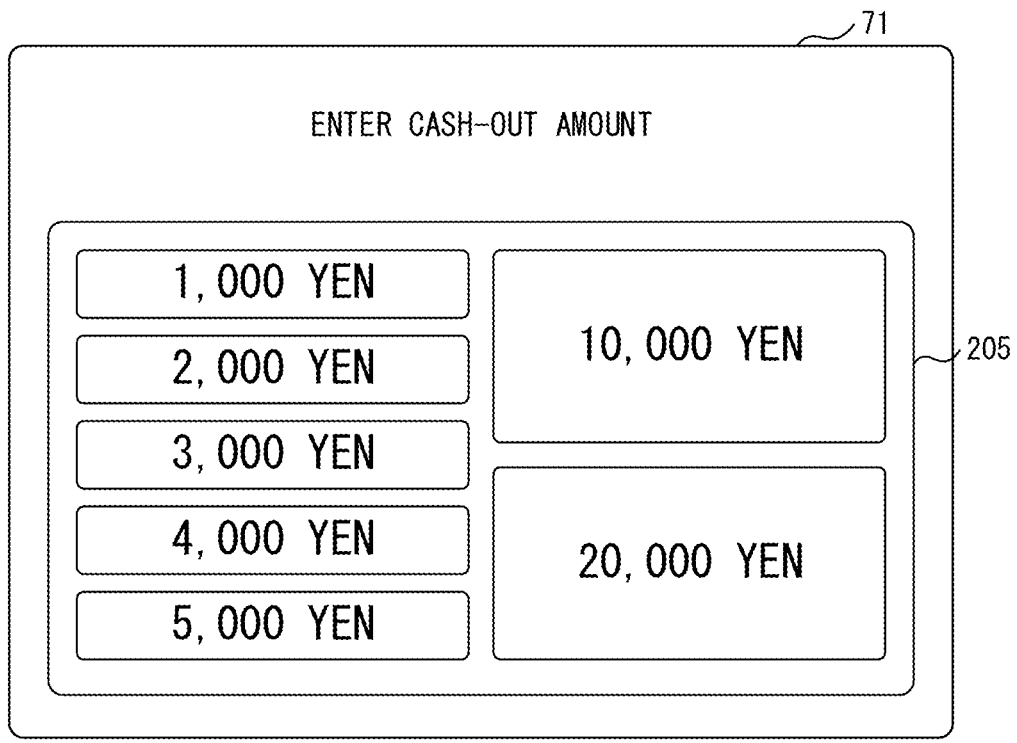
F I G. 1 8

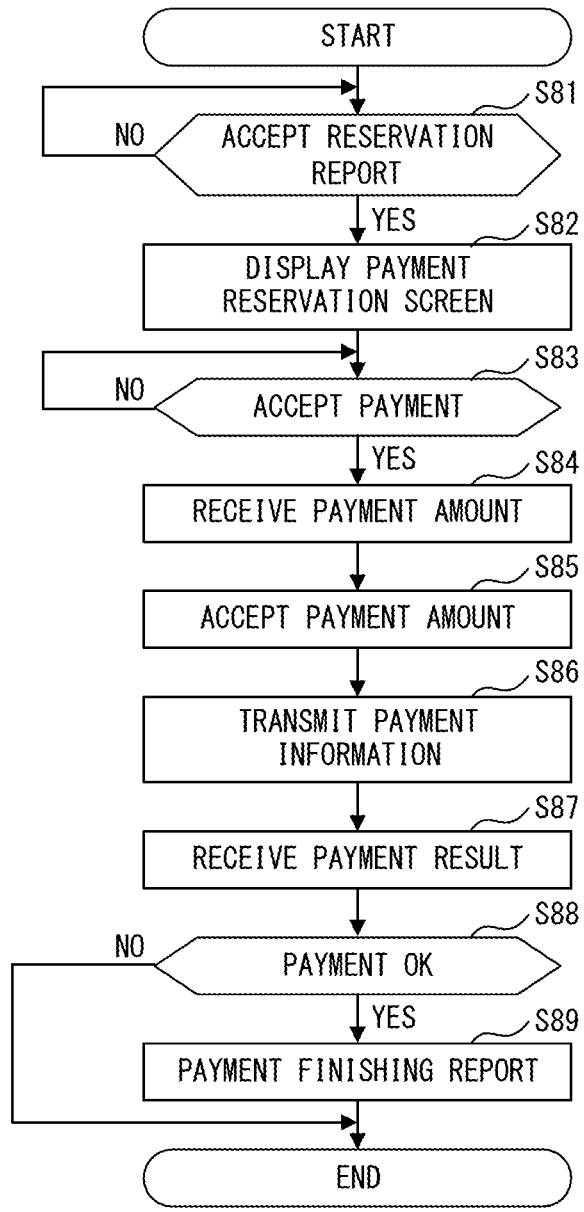
F I G. 1 9

THIS MACHINE IS
CURRENTLY UNAVAILABLE.
PLEASE USE ANOTHER MACHINE.

FIG. 20

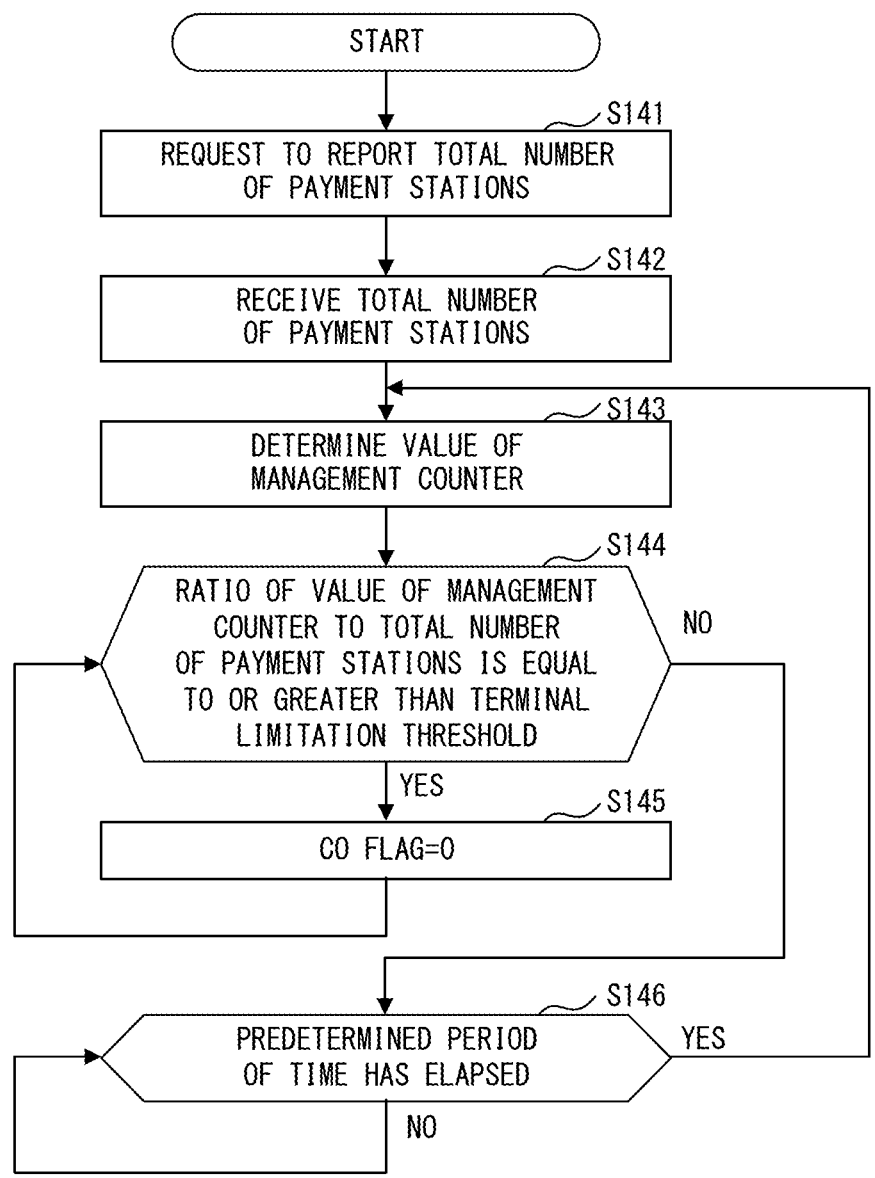
F I G. 2 3

SELF-PAYMENT SYSTEM, MANAGEMENT APPARATUS, AND TERMINAL MANAGEMENT METHOD

CROSS-REFERENCE TO RELATED APPLICATION

This application is continuation application of International Application PCT/JP2019/003458 filed on Jan. 31 2019 and designated the U.S., the entire contents of which are incorporated herein by reference.

FIELD

The aspects described herein are related to a self-payment system, a management apparatus, and a terminal management method.

BACKGROUND

Upon the recent deregulation associated with the revision of the Banking Act, a technique has been known wherein cash-out is performed using a payment terminal in a point-of-sale (POS) system provided in a store such as a supermarket, instead of using an automatic teller machine (ATM) provided in a bank, a convenience store, or the like. For example, Japanese Laid-open Patent Publication No. 2008-077481 discloses the technique of performing settling processes separately for ordinary product purchases and for uses of cash-out.

Regarding one form of a POS system, a semi-self checkout machine has started to be introduced wherein a store clerk registers, by means of a product registration terminal, a product to be purchased, and a customer makes payment by using a payment terminal (see, for example, Japanese Laid-open Patent Publication No. 2012-003561).

However, when cash-out is performed using the payment terminal described in patent document 1, a large amount of cash will be taken from the payment terminal, and hence the store clerk will often need to perform a cash operation of replenishing cash such that there is sufficient cash in the payment terminal.

When a payment process is performed using the payment terminal of the semi-self checkout machine described in patent document 2, a large amount of cash will be entered in the payment terminal, and hence the store clerk will often need to perform a cash operation of taking out cash such that an excessive amount of cash is not in the payment terminal.

In view of the abovementioned problems, an object of the present invention is to provide a management apparatus capable of reducing troubles with cash operations to be performed by store clerks and decreasing the costs for store operations.

SUMMARY

A self-payment system in accordance with a first aspect of the present invention includes a product registration terminal that registers a product to be purchased, a payment terminal with which a customer makes payment, and a management apparatus that manages the product registration terminal and the payment terminal. The payment terminal includes a money-insertion acceptance unit for accepting insertion of cash upon payment for a product to be purchased that has been registered on the basis of the product registration terminal, and a money-ejection acceptance unit for accepting ejection of cash on the basis of a manipulation performed by a customer on the payment terminal. The management apparatus includes a cash amount determination unit for determining an amount of cash within the payment terminal, and a cash processing restriction unit for restricting money-insertion acceptance by the money-insertion acceptance unit of the payment terminal or money-ejection acceptance by the money-ejection acceptance unit of the payment terminal in accordance with the amount of cash determined by the cash amount determination unit.

A management apparatus in accordance with a second aspect of the invention that manages a product registration terminal that resisters a product to be purchased and a payment terminal with which a customer makes payment includes a cash amount determination unit that determines an amount of cash within the payment terminal, and a cash processing restriction unit that restricts, in accordance with the determined amount of cash, money-insertion acceptance by a money-insertion acceptance unit of the payment terminal that accepts insertion of cash upon payment for a product to be purchased that has been registered on the basis of the product registration terminal or money-ejection acceptance by a money-ejection acceptance unit of the payment terminal that accepts ejection of cash on the basis of a manipulation performed by a customer.

A terminal management method for a management apparatus in accordance with a third aspect of the invention manages a product registration terminal that resisters a product to be purchased and a payment terminal with which a customer makes payment. The terminal management method for the management apparatus includes determining, by the management apparatus, an amount of cash within the payment terminal, and restricting, in accordance with the determined amount of cash, money-insertion acceptance by a money-insertion acceptance unit of the payment terminal that accepts insertion of cash upon payment for a product to be purchased that has been registered on the basis of the product registration terminal or money-ejection acceptance by a money-ejection acceptance unit of the payment terminal that accepts ejection of cash on the basis of a manipulation performed by a customer.

A program in accordance with a fourth aspect of the invention causes a computer for a management apparatus that manages a product registration terminal for registering a product to be purchased and a payment terminal with which a customer makes payment to perform a process including determining an amount of cash within the payment terminal, and restricting, in accordance with the determined amount of cash, money-insertion acceptance by a money-insertion acceptance unit of the payment terminal that accepts insertion of cash upon payment for a product to be purchased that has been registered on the basis of the product registration terminal or money-ejection acceptance by a money-ejection acceptance unit of the payment terminal that accepts ejection of cash on the basis of a manipulation performed by a customer.

The object and advantages of the invention will be realized by means of the elements and combinations particularly pointed out in the claims.

BRIEF DESCRIPTION OF DRAWINGS

FIG. 1 illustrates an example of a self-payment system 1 that includes a management apparatus in accordance with embodiments;

FIG. 3 illustrates an example of a payment-station (PS) management table;

FIG. 4 illustrates an example of a threshold table;

FIG. 5 illustrates an example of an operation time table;

FIG. 6 illustrates a configuration example of a self-payment system within a store;

FIG. 9 illustrates the hardware configuration of a control unit in a payment station;

FIG. 10 illustrates the hardware configuration of a control unit in a management server;

FIG. 16 is a flowchart illustrating an example of a cash-out process;

FIG. 18 illustrates an example of a cash-out amount acceptance screen displayed on a display;

FIG. 19 is a flowchart illustrating an example of a payment process;

FIG. 20 illustrates an example of a payment reservation screen displayed on a display;

FIG. 23 is a flowchart illustrating an example of a terminal-count limitation process.

DESCRIPTION OF EMBODIMENTS

Figure 2:
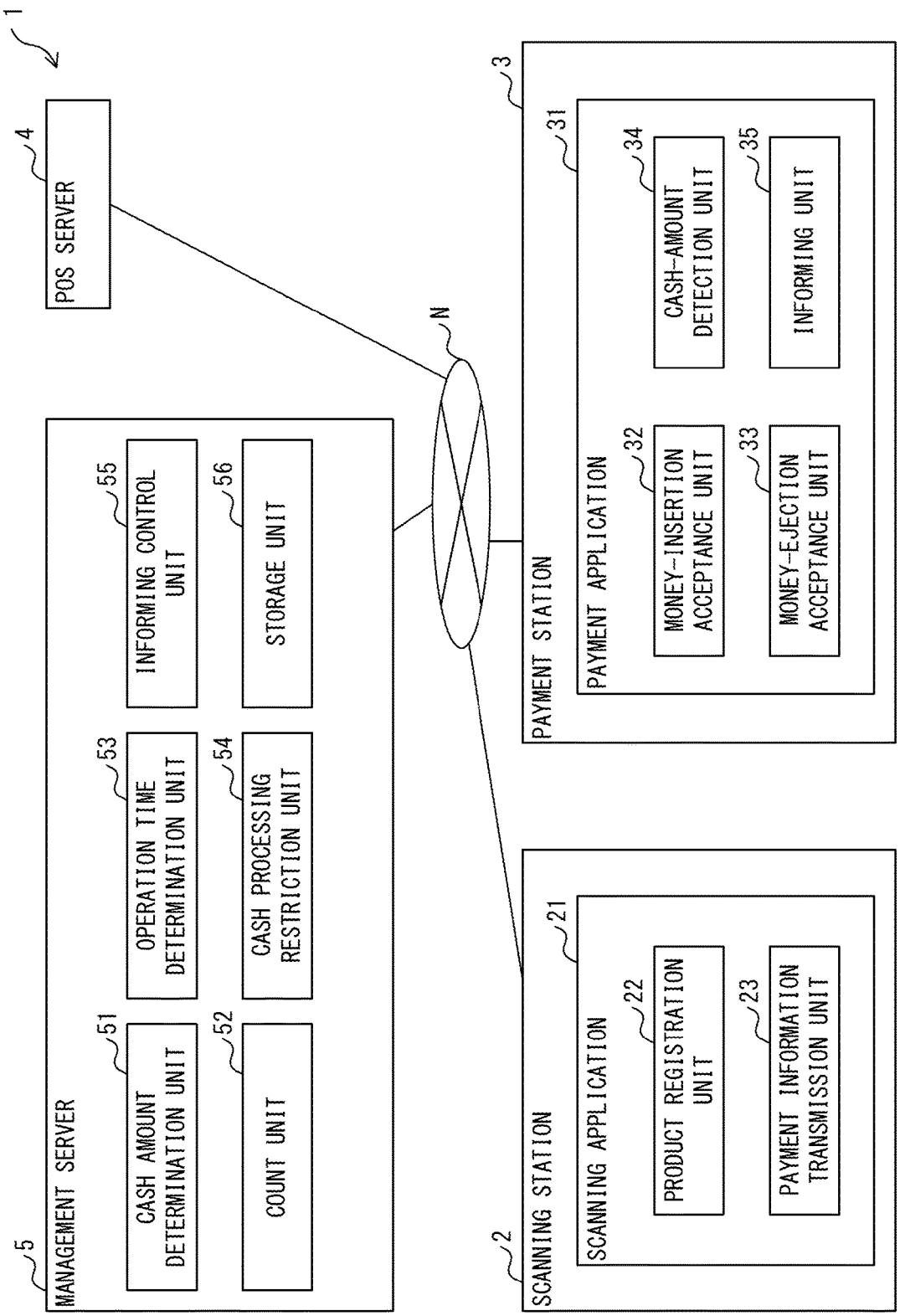
FIG. 2 illustrates an example of the functional configuration of a self-payment system in accordance with embodiments.

The following describes embodiments by referring to the drawings. First, by referring to FIG. 1, descriptions are given of an example of a self-payment system 1 that includes a management apparatus in accordance with embodiments. The self-payment system 1 includes two scanning stations (payment terminals) 2A and 2B, four payment stations (product registration terminals) 3A, 3B, 3C, and 3D, a POS server 4, and a management server (management apparatus) 5. The self-payment system 1 in accordance with embodiments is a form of a semi-self checkout machine.

Although FIG. 1 depicts two scanning stations, the invention is not limited to this, and n (n≥1) scanning stations 2 may be provided. The scanning stations 2A and 2B may hereinafter be each referred to as a "scanning station 2" when these two are described without being particularly distinguished from each other.

Although FIG. 1 depicts four payment stations, the invention is not limited to this, and m (m≥1) payment stations may be provided. The payment stations 3A, 3B, 3C, and 3D may hereinafter be each referred to as a "payment station 3" when these four are described without being particularly distinguished from each other.

The self-payment system 1 is such that a store clerk registers, with a scanning station 2, a product to be purchased, and a customer makes payment by using a payment station 3.

The scanning stations 2, the payment stations 3, the POS server 4, and the management server 5 are connected via a network N. The scanning stations 2, the payment stations 3, the POS server 4, and the management server 5 may be connected using an exclusive line.

FIG. 2 illustrates an example of the functional configuration of the self-payment system 1 in accordance with embodiments.

The scanning station 2 is an apparatus with which a store clerk performs product registration, with a product to be purchased as a product for transaction, by scanning a bar code presented on the product. The scanning station 2 includes a scanning application 21. The scanning application 21 includes a function for outputting, via the POS server 4, payment information for making a request for the payment station 3 to perform a payment process. The scanning application 21 includes a product registration unit 22 and a payment information transmission unit 23. The product registration unit 22 performs a product registration process for registering, as a product for transaction, a product to be purchased, by scanning a bar code presented on the product. For example, the product registration unit 22 may report information on a bar code (e.g., Japanese-article-number (JAN) code) to the POS server 4, obtain a product name and a price corresponding to the bar code, and register a product. The payment information transmission unit 23 transmits, to the POS server 4 via the network N, payment information obtained as a result of the product registration unit 22 performing product registration.

The payment station 3 is an apparatus with which a customer makes payment. The payment station 3 includes a payment application 31. The payment application 31 performs a payment process on the basis of payment information transmitted from the scanning station 2 and performs a cash-out process for ejecting cash on the basis of a manipulation performed by a customer. The payment application 31 includes a money-insertion acceptance unit 32, a money-ejection acceptance unit 33, a cash-amount detection unit 34, and an informing unit 35.

The money-insertion acceptance unit 32 accepts insertion of cash upon payment of a product to be purchased that has been registered on the basis of the scanning station 2. The money-ejection acceptance unit 33 accepts cash-out for ejecting cash on the basis of a manipulation performed by a customer on the payment station 3.

The cash-amount detection unit 34 detects the amount of cash inserted into, or ejected from, the payment station 3. For each of the denominations of bills (10,000 yen, 5,000 yen, 1,000 yen) and coins (500 yen, 100 yen, 50 yen, 10 yen, 5 yen, 1 yen), the cash-amount detection unit 34 can detect the amount of cash (the number of bills or coins) stored in the payment station 3. The bills may include 2,000 yen bills.

The cash-amount detection unit 34 reports, to the management server 5, identification numbers for uniquely identifying the payment stations 3A, 3B, 3C, and 3D (hereinafter, "payment station (PS) numbers") and information on the detected amount of cash within the payment station 3. On the basis of an informing instruction from the management server 5, the informing unit 35 informs a customer of a payment station 3 for which money-ejection acceptance has been restricted, by means of a guidance screen or a light display mode (both described hereinafter).

The management server 5 is connected to the scanning station 2 and the payment station 3 via the network N and manages the scanning station 2 and the payment station 3.

The management server 5 includes a cash-amount determination unit 51, a count unit 52, an operation time determination unit 53, a cash processing restriction unit 54, an informing control unit 55, and a storage unit 56.

The cash amount determination unit 51 stores PS numbers and the amounts of cash transmitted from the payment stations 3 in a payment-station (PS) management table 100 stored in the storage unit 56. FIG. 3 illustrates an example of the PS management table 100. PS numbers "1," "2," "3," and "4" are respectively identification numbers corresponding to the payment stations 3A, 3B, 3C, and 3D.

For each of the PS numbers, the PS management table 100 stores the amount (number) of cash of each of the denominations of bills (10,000 yen, 5,000 yen, 1,000 yen) and coins (500 yen, 100 yen, 50 yen, 10 yen, 5 yen, 1 yen), the value of a cash-out flag (CO), the value of a payment flag (S), and the value of an operation time flag (T).

A cash-out flag (CO) is information indicating whether cash-out can be performed using a payment station 3 with a corresponding PS number. The cash amount determination unit 51 sets a cash-out flag (CO) in accordance with whether the amount of cash with a corresponding PS number is equal to or less than a cash-out threshold (first threshold). The cash-out threshold will be described with reference to a threshold table hereinafter.

A payment flag (S) is information indicating whether a payment process can be performed using a payment station 3 with a corresponding PS number. The cash amount determination unit 51 sets a payment flag (S) in accordance with whether the amount of cash with a corresponding PS number is equal to or greater than a payment threshold (second threshold). The payment threshold will be described with reference to the threshold table hereinafter.

An operation time flag (T) is information indicating whether the current time is in a time slot in which cash-out can be performed using a payment station 3 with a corresponding PS number. The operation time determination unit 53 sets an operation time flag (T) in accordance with whether an operation time is a time when cash-out can be performed. The time slot in which cash-out can be performed will be described with reference to an operation time table hereinafter.

FIG. 4 illustrates an example of a threshold table 110. The threshold table 110 is stored in the storage unit 56 in advance. The threshold table 110 stores, for each of the cash-out threshold and the payment threshold, the value of the amount of cash (number) of each of the denominations of bills (10,000 yen, 5,000 yen, 1,000 yen) and coins (500 yen, 100 yen, 50 yen, 10 yen, 5 yen, 1 yen).

The cash amount determination unit 51 sets "1" (ON) for the cash-out flag (CO) when the amounts of cash of a corresponding PS number are greater than all of the cash-out thresholds, i.e., when cash-out can be performed. For example, since the amounts of cash of the PS number "3" in the PS management table 100 in FIG. 3 are greater than all of the cash-out thresholds in the threshold table 110 in FIG. 4, the cash amount determination unit 51 sets "1" for the cash-out (CO) flag.

By contrast, the cash amount determination unit 51 sets "0" (OFF) for the cash-out flag (CO) when the amount of cash of a corresponding PS number is equal to or less than a cash-out threshold, i.e., when cash-out cannot be performed. Regarding, for example, the amounts of cash of the PS number "2" in the PS management table 100 in FIG. 3, since the amount of cash "2" of "10,000 yen" is equal to or less than the cash-out threshold "2" of "10,000 yen" in the threshold table 110 in FIG. 4, the cash amount determination unit 51 sets "0" for the cash-out (CO) flag.

The cash amount determination unit 51 sets "1" (ON) for the payment flag (S) when the amounts of cash of a corresponding PS number are less than all of the payment thresholds, i.e., when payment can be performed. For example, since the amounts of cash of the PS number "3" in the PS management table 100 in FIG. 3 are less than all of the payment thresholds in the threshold table 110 in FIG. 4, the cash amount determination unit 51 sets "1" for the payment threshold (S) flag.

By contrast, the cash amount determination unit 51 sets "0" (OFF) for the payment flag (S) when an amount of cash of a corresponding PS number is equal to or greater than any of the payment thresholds, i.e., when payment cannot be performed, as cash can be no longer inserted into the payment station 3. For example, since all of the amounts of cash of the PS number "1" in the PS management table 100 in FIG. 3 are equal to or greater than the payment thresholds in the threshold table 110 in FIG. 4, the cash amount determination unit 51 sets "0" for the payment flag (S).

FIG. 5 illustrates an example of an operation time table 120. The operation time table 120 is stored in the storage unit 56 in advance.

The operation time table 120 stores, for a time slot in which cash-out can be performed, information on the operation time flag (T) for each of information on a cash-out start time and information on a cash-out end time. The information on the start time and the end time can be optionally changed.

The operation time determination unit 53 sets "1" (ON) for the operation time flag (T) when the operation start time for a corresponding PS number has been reached, i.e., when the current time is in the period of the operation time. For example, in the case of the start time in the operation time table 120 in FIG. 5, i.e., "10:00," when the current time has reached "10:00," i.e., when the current time is in the period of an operation time in which cash-out can be performed, the operation time determination unit 53 may set "1" (ON) for the operation time flag (T) of the PS number in the PS management table 100 in FIG. 3.

By contrast, "0" (OFF) is set for the operation time flag (T) when the operation end time for a corresponding PS number has been reached, i.e., when the current time is not in the period of the operation time. For example, in the case of the end time in the operation time table 120 in FIG. 5, i.e., "20:30," when the current time has reached "20:30," i.e., when the current time has gone out of the period of an operation time in which cash-out can be performed, the operation time determination unit 53 may set "0" (OFF) for the operation time flag (T) in the PS management table 100 in FIG. 3.

In accordance with an amount of cash determined by the cash amount determination unit 51, the cash processing restriction unit 54 restricts money-insertion acceptance by the money-insertion acceptance unit 32 in the payment station 3 or money-ejection acceptance by the money-ejection acceptance unit 33 in the payment station 3. In particular, when an amount of cash determined by the cash amount determination unit 51 is equal to or less than the cash-out threshold, the cash processing restriction unit 54 restricts money-ejection acceptance by the money-ejection acceptance unit 33. Thus, when the cash-out flag (CO) in the PS management table 100 in FIG. 3 is "0" (OFF), the cash processing restriction unit 54 restricts cash-out to be performed using a payment station 3 with a PS number corresponding to the cash flag "0." In this case, the cash processing restriction unit 54 can transmit information on the cash flag (CO) "0" to the payment station 3 corresponding to the PS number so as to shift the payment station 3 to a payment mode.

Accordingly, a payment station 3 with a small amount of cash can perform the payment process, so that cash replenishing can be attained with cash inserted into the payment station 3.

When an amount of cash determined by the cash amount determination unit 51 is equal to or greater than a payment threshold, the cash processing restriction unit 54 restricts money-insertion acceptance by the money-insertion acceptance unit 32. Thus, when the payment flag (S) in the PS management table 100 in FIG. 3 is "0" (OFF), the cash processing restriction unit 54 restricts payment to be performed using a payment station 3 with a PS number corresponding to the payment flag (S) "0." In this case, the cash processing restriction unit 54 can transmit information on the payment flag (S) "0" to the payment station 3 corresponding to the PS number so as to shift the payment station 3 to a cash-out mode.

Accordingly, a payment station 3 with a large amount of cash can perform the cash-out process, so that cash reduction can be attained by ejecting cash from the payment station 3.

When the operation time determination unit 53 determines that the current time is not in the period of the operation time of a payment station 3, the cash processing restriction unit 54 restricts money-ejection acceptance by the money-ejection acceptance unit 33. Thus, when the operation time flag (T) in the PS management table 100 in FIG. 3 is "0" (OFF), the cash processing restriction unit 54 restricts cash-out by a payment station 3 with a PS number corresponding to the operation time flag "0."

Accordingly, payment stations 3 that can perform cash-out can be limited in accordance with the time slot. For example, cash-out may be disabled when there are few store clerks, e.g., during a night-time period, thereby attaining efficient store operations.

When the ratio "c/m" of the value c of a management counter counted by the count unit 52 to the total number m of payment stations 3 is equal to or greater than a terminal limitation threshold, the cash processing restriction unit 54 restricts money-ejection acceptance by the money-ejection acceptance unit 33. Thus, the cash processing restriction unit 54 restricts cash-out by a payment station 3 with a corresponding PS number. Accordingly, the number of payment stations 3 that can perform cash-out can be adjusted in accordance with the customer usage situation.

The cash processing restriction unit 54 reports a PS number, information on the cash-out flag (CO) corresponding to the PS number, and information on the payment flag (S) and the operation time flag (T) to all of the payment stations 3.

The count unit 52 counts, by means of the management counter, a number from the start of product registration by a scanning station 2 to the end of payment by a payment station 3 and a number from the start of money-ejection acceptance by the payment station 3 to the end of the money ejection.

In particular, the count unit 52 adds 1 to the management counter when a scanning station 2 starts product registration. Then, when a payment station 3 ends payment, 1 is subtracted from the management counter. When a payment station 3 starts a cash-out process, the count unit 52 adds 1 to the management counter. Then, when the payment station 3 ends the cash-out process, 1 is subtracted from the management counter 1. The count unit 52 stores the value c of the management counter in the storage unit 56.

The cash processing restriction unit 54 determines whether the ratio "c/m" of the value c of the management counter counted by the count unit 52 to the total number m of payment stations 3 is equal to or greater than a terminal limitation threshold (third threshold). When the ratio "c/m" of the value c of the management counter counted by the count unit 52 to the total number m of payment stations 3 is equal to or greater than the terminal limitation threshold, the cash processing restriction unit 54 limits the number of payment stations 3 for which money-ejection acceptance units 33 accept money ejection. In particular, by referring to the PS management table 100 in FIG. 3, the cash processing restriction unit 54 sets "0" (OFF) for the cash-out flags (CO) of PS numbers having cash-out flags of "1" (ON), until the ratio "c/m" of the value c of the management counter to the total number m of payment stations 3 falls below the terminal limitation threshold.

The following describes a situation in which the total number m of payment stations 3 is "4" and the terminal limitation threshold is "0.5." For example, the management counter may be "3" when the number of scanning stations 2 performing product registration is "1," the number of payment stations 3 in the process of payment is "1," and the number of payment stations 3 performing a cash-out process is "1."

In this case, the ratio "c/m" of the value of the management counter counted by the count unit 52, c="3," to the total number of payment stations 3, m="4," is "0.75," which is equal to or greater than the terminal limitation threshold "0.5," so the cash processing restriction unit 54 limits the number of payment stations 3 for which money-ejection acceptance units 33 accept money ejection.

Thus, if the ratio "c/m" of the number of scanning stations 2 performing product registration, the number of payment stations 3 in the process of payment, and the number of payment stations 3 performing a cash-out process to the total number m of payment stations 3 is equal to or greater than the terminal limitation threshold, the convenience of customers who would perform a payment process using payment stations 3 could be harmed.

In embodiments, accordingly, the number of payment stations 3 with which a cash-out process can be preformed is limited so that a balance can be kept between customers who perform the payment process and customers who perform cash-out so as to improve the convenience of both groups of customers.

When the cash processing restriction unit 54 restricts money-ejection acceptance by a money-ejection acceptance unit 33, the informing control unit 55 performs control for causing the informing unit 35 to inform that money-ejection acceptance by the money-ejection acceptance unit 33 has been restricted.

In particular, the informing control unit 55 reports an informing instruction to a payment station 3 for which money-ejection acceptance has been restricted. The informing unit 35 of the payment station 3 that has received the informing instruction informs a customer of the fact that money-ejection acceptance has been restricted and cash-out cannot be performed, by means of the guidance screen or the light display mode (both described hereinafter).

FIG. 6 illustrates a configuration example of a self-payment system 1 within a store. The self-payment system 1 includes two scanning stations 2A and 2B, four payment stations 3A, 3B, 3C, and 3D, a POS server 4, and a management server 5, all of which are communicably connected via a network N.

The scanning stations 2 are disposed side by side within a payment area in the store and can concurrently process transactions for a plurality of customers. At each of the scanning stations 2, a store clerk performs product registration by scanning individual bar codes on products to be purchased that has been carried in a shopping basket by a customer, and upon the product registration being finished, the scanning station 2 transmits corresponding payment information to the POS server 4. The payment information includes a total payment amount.

The payment stations 3 are installed in the vicinity of the scanning stations 2 and allow customers to immediately make payment for transactions for which product registration has been finished. Upon a payment process being started, the payment station 3 acquires payment information from the POS server 4 and performs the payment process on the basis of the payment information.

During the payment process, the payment station 3 performs a cash-out process for accepting cash ejection on the basis of a manipulation performed by a customer. The payment station 3 detects the amount of cash therewithin and reports the detected amount of cash to the management server 5 together with a PS number.

Every time production registration is performed at a scanning station 2, the POS server 4 stores payment information sent thereto and performs various processes such as inventory management on the basis of the payment information.

In accordance with the amount of cash within a payment station 3 that is reported therefrom, the management server 5 controls money-insertion acceptance or money-ejection acceptance for the payment station 3.

Figure 7:
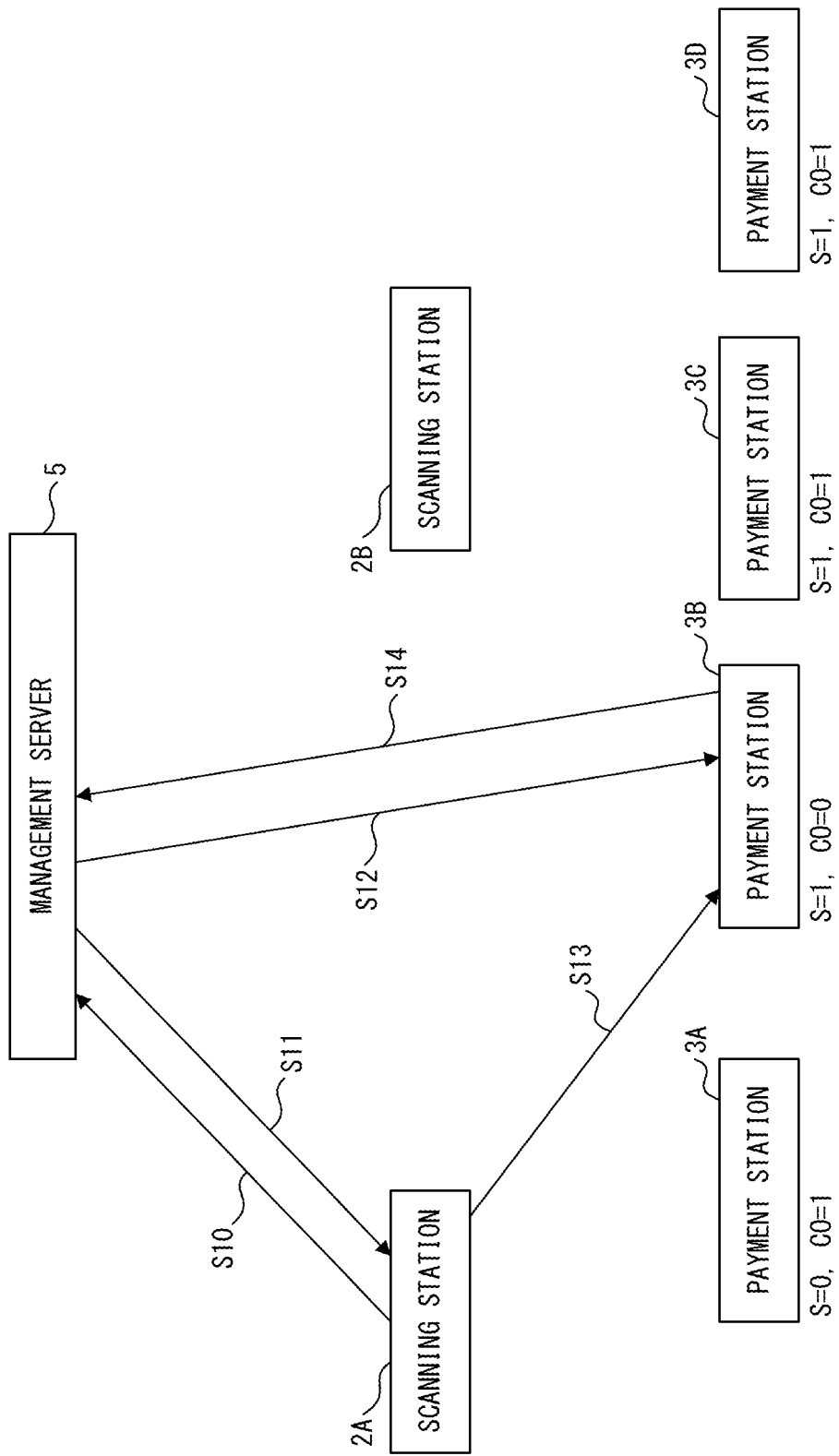
FIG. 7 illustrates an overview of a cash control process performed by a management server.

The following describes an overview of a cash control process performed by the management server 5. FIG. 7 illustrates an overview of the cash control process performed by the management server 5. First, upon product registration being started, the scanning station 2A puts a query to the management server 5 (step S10).

The management server 5 refers to the PS management table in FIG. 3 and selects a payment station 3B having a PS number of "2" and a payment flag (S) of "1." The management server 5 sends a reply to the scanning station 2A so as to inform that payment should be performed using the selected payment station 3B (step S11).

The management server 5 transmits, to the payment station 3B selected in step S11, a reservation report for reserving that a payment mode has been entered, and sets a cash-out flag (CO)="0" in the PS management table 100 in FIG. (step S12). Upon receipt of the reservation report, the payment station 3B shifts to the payment mode and displays a payment reservation screen (described hereinafter) on a display. By displaying the payment reservation screen on the display, the payment station 3B reports to customers that the payment station 3B is scheduled to be used for a payment process and thus in use. Upon product registration being finished, the scanning station 2A transmits payment information to the payment station 3B via the POS server 4 (step S13). Upon the payment process being finished, the payment station 3B transmits a payment finishing report to the management server 5 (step S14).

Figure 8:
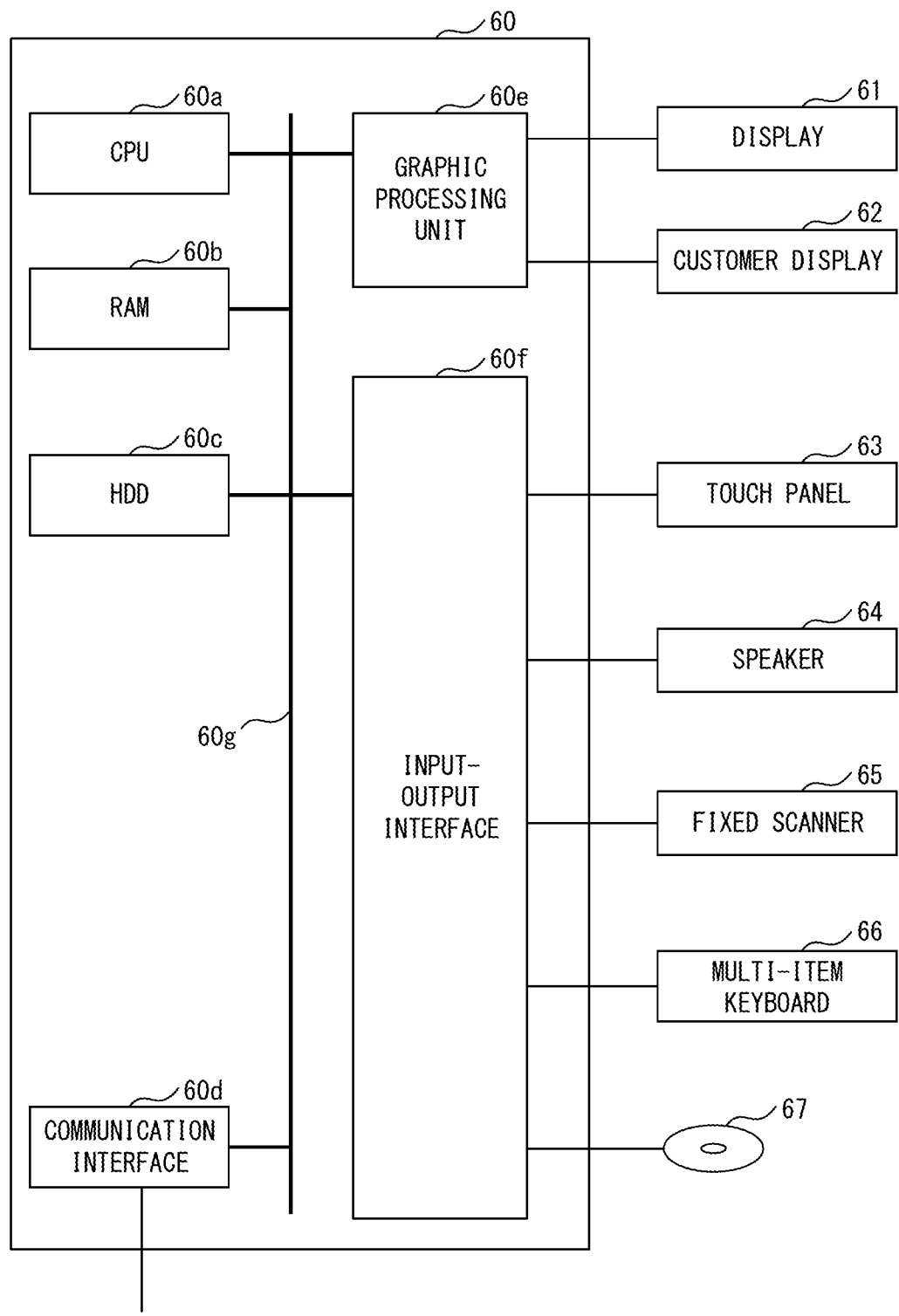
FIG. 8 illustrates the hardware configuration of a control unit in a scanning station.

FIG. 8 illustrates the hardware configuration of a control unit in the scanning station 2. The scanning station 2 includes a control unit 60 and various peripheral apparatuses. The entirety of the scanning station 2 is controlled by a central processing unit (CPU) 60a provided in the control unit 60. A random access memory (RAM) 60b, a hard disk drive (HDD) 60c, a communication interface 60d, a graphic processing apparatus 60e, and an input-output interface 60f are connected to the CPU 60a via a bus 60g.

At least a portion of a program for an operating system (OS) to be executed by the CPU 60a or at least a portion of a program for the scanning application 21 is temporarily stored in the RAM 60b. Various data necessary for processing to be performed by the CPU 60a is stored in the RAM 60b. An OS and application programs, including the scanning application 21, are stored in the HDD 60c.

A display 61 and a customer display 62 are connected to the graphic processing apparatus 60e. The display 61 displays a predetermined graphic user interface (GUI) for a store clerk to perform a transaction task. The customer display 62 displays a transaction amount or the like for a customer. The graphic processing apparatus 60e displays an image on the screens of the display 61 and the customer display 62 in accordance with an instruction from the CPU 60a.

A touch panel 63, a speaker 64, a fixed scanner 65, and a multi-item keyboard 66 are connected to the input-output interface 60f. The touch panel 63 is an input apparatus for selecting a product on which a bar code is not presented (e.g., ready-prepared foods or perishable foods such as vegetables or fish that are being sold loose) from a product group displayed on the display 61. The speaker 64 provides audio outputs in different modes for a situation in which product registration has been performed normally, a situation in which attention of a store clerk needs to be drown, and the like. The fixed scanner 65 is an apparatus toward which a store clerk directs a bar code presented on a product, so as to read the bar code presented on the product. For example, the multi-item keyboard 66 may be an input apparatus that accepts a correcting manipulation performed by a store clerk who has found a manipulation error upon the speaker 64 providing an audio output for drawing his/her attention. The input-output interface 60f can be connected to an external-storage-medium interface that can write/read information to/from the external storage medium 67. The input-output interface 60f transmits a signal sent from the fixed scanner 65, the touch panel 63, the multi-item keyboard 66, or the external-storage-medium interface to the CPU 60a via the bus 60g. The input-output interface 60f also causes the speaker 64 to produce a sound in accordance with an instruction from the CPU 60a.

For example, the communication interface 60d may be connected to the payment stations 3, the POS server 4, and the management server 5 via a network N based on an Ethernet® standard.

The above-described hardware configuration can implement the processing functions of the scanning station 2 in accordance with embodiments.

FIG. 9 is a hardware configuration diagram of a control unit in the payment station 3. Note that features similar to those in the control unit 30 of the scanning station 2 are omitted as appropriate in FIG. 8.

The payment station 3 includes a control unit 70. The control unit 70 is connected to various peripheral apparatuses. The entirety of the payment station 3 is controlled by a CPU 70a provided in the control unit 70. A RAM 70b, a HDD 70c, a communication interface 70d, a graphic processing apparatus 70e, and an input-output interface 70f are connected to the CPU 70a via a bus 70g. The HDD 70c stores a program for the payment application 31.

A display 71 is connected to the graphic processing apparatus 70e. The display 71 displays manipulation guidance or a manipulation menu for the payment station 3 or displays information such as a product name, the price of a product, the amount of money received upon payment, a payment amount for a transaction, or the amount of change. The display 71 also displays an acceptance screen or a guidance screen for a cash-out process. A touch panel 72, a magnetic card reader 73, a bar code scanner 74, a touch scanner 75, a printer 76, a PATLITE® 77, a bill recycle unit (hereinafter, "BRU") 78, and a coin recycle unit (hereinafter, "CRU") 79 are connected to the input-output interface 70f. The touch panel 72 accepts input of manipulation information such as a payment instruction or a cash-out instruction based on a touch manipulation performed by a customer in accordance with an indication on the display 71. The magnetic card reader 73 reads information recorded in a magnetic stripe on a magnetic card such as a credit card or a point card. The bar code scanner 74 and the touch scanner 75 are input apparatuses that are required for operations using a payment ticket and read a transaction code by imaging the payment ticket with a camera or by scanning the payment ticket with laser light. The printer 76 issues a receipt on which payment details are printed. For example, the PATLITE 77 may inform, by means of a light display mode, a customer of the payment station 3 with which the customer should make payment. Alternatively, on the basis of an informing instruction from the management server 5, the PATLITE 77 may inform, by means of a light display mode, a customer of the fact that money-ejection acceptance has been restricted. Note that the display 71 and the PATLITE 77 are a form of the informing unit 35.

The BRU 78 is an apparatus that handles inserted bills or bills to be ejected. The BRU 78 includes a fixed stacker (not illustrated) for storing inserted bills and bills to be ejected, a bill cassette (not illustrated) for storing bills with which the fixed stacker is to be replenished, a money-left-behind box (not illustrated) for storing bills that customers have forgotten to take, and an operation reject (operation RJ) box (not illustrated) for storing bills that were incapable of being validated when performing payment transactions or bill replenishing and bills received in money-insertion transactions or the like. The bills stored in the fixed stacker or the bill cassette undergo a counting process at a timing at which the BRU 78 is loaded with the bill cassette, and the number of counted bills is stored in the RAM 70b or the like in the payment station 3. The number of bills that has been stored is updated, as appropriate, in accordance with an increase or decrease in the number of bills in a money-insertion or money-ejection transaction or the like.

The CRU 79 is an apparatus that handles inserted coins or coins to be ejected. As with the BRU 78, the CRU 79 includes a fixed stacker for storing inserted coins and coins to be ejected, a coin cassette for storing coins with which the fixed stacker is to be replenished, a money-left-behind box for storing coins that customers have forgotten to take, and an operation reject (operation RJ) box for storing coins that were incapable of being validated when performing payment transactions or coin replenishing. The coins stored in the fixed stacker or the coin cassette undergo a counting process at a timing at which the CRU 79 is loaded with the coin cassette, and the number of counted coins is stored in the RAM 70b or the like in the payment station 3. The number of coins that has been stored is updated, as appropriate, in accordance with an increase or decrease in the number of coins in a money-insertion or money-ejection transaction or the like.

The input-output interface 70f can be connected to an external-storage-medium interface that can write/read information to/from the external storage medium 80. The input-output interface 70f transmits a signal sent from the touch panel 72, the magnetic card reader 73, the bar code scanner 74, the touch scanner 75, the BRU 78, or the CRU 79 to the CPU 70a via the bus 70g. The communication interface 70d is connected to the scanning stations 2, the POS server 4, and the management server 5 via the network N.

The above-described hardware configuration can implement the processing functions of the payment station 3 in accordance with embodiments.

FIG. 10 illustrates a hardware configuration diagram of a control unit in the management server 5. The management server 5 includes a control unit 90 and various peripheral apparatuses. The entirety of the management server 5 is controlled by a CPU 90a provided in the control unit 90. A RAM 90b, a HDD 90c, a communication interface 90d, a graphic processing apparatus 90e, and an input-output interface 90f are connected to the CPU 90a via a bus 90g.

At least a portion of a program for an OS to be executed by the CPU 90a or at least a portion of a program for a cash management process is temporarily stored in the RAM 90b. Various data necessary for processing to be performed by the CPU 90a is stored in the RAM 90b. The HDD 90c stores application programs, including programs for the OS, the cash control process, a flag management process, the management counter control process performed upon payment, the management counter control process performed upon a cash-out process, and the terminal-count limitation process. The HDD 90c also stores the PS management table 100 in FIG. 3, the threshold table 110 in FIG. 4, and the operation time table 120 in FIG. 5. The HDD 90c functions as the storage unit 56 of the management server 5.

A display 91 is connected to the graphic processing apparatus 90e. A keyboard 92 is connected to the input-output interface 90f. The input-output interface 90f can be connected to an external-storage-medium interface that can write/read information to/from the external storage medium 93. The input-output interface 90f transmits a signal sent from the keyboard 92 or the external-storage-medium interface to the CPU 90a via the bus 90g.

For example, the communication interface 90d may be connected to the scanning stations 2, the payment stations 3, and the POS server 4 via the network N.

The above-described hardware configuration can implement the processing functions of the management server 5 in accordance with embodiments. The POS server 4 may include a component similar to the control unit 90 provided in the management server 5.

Figure 11:
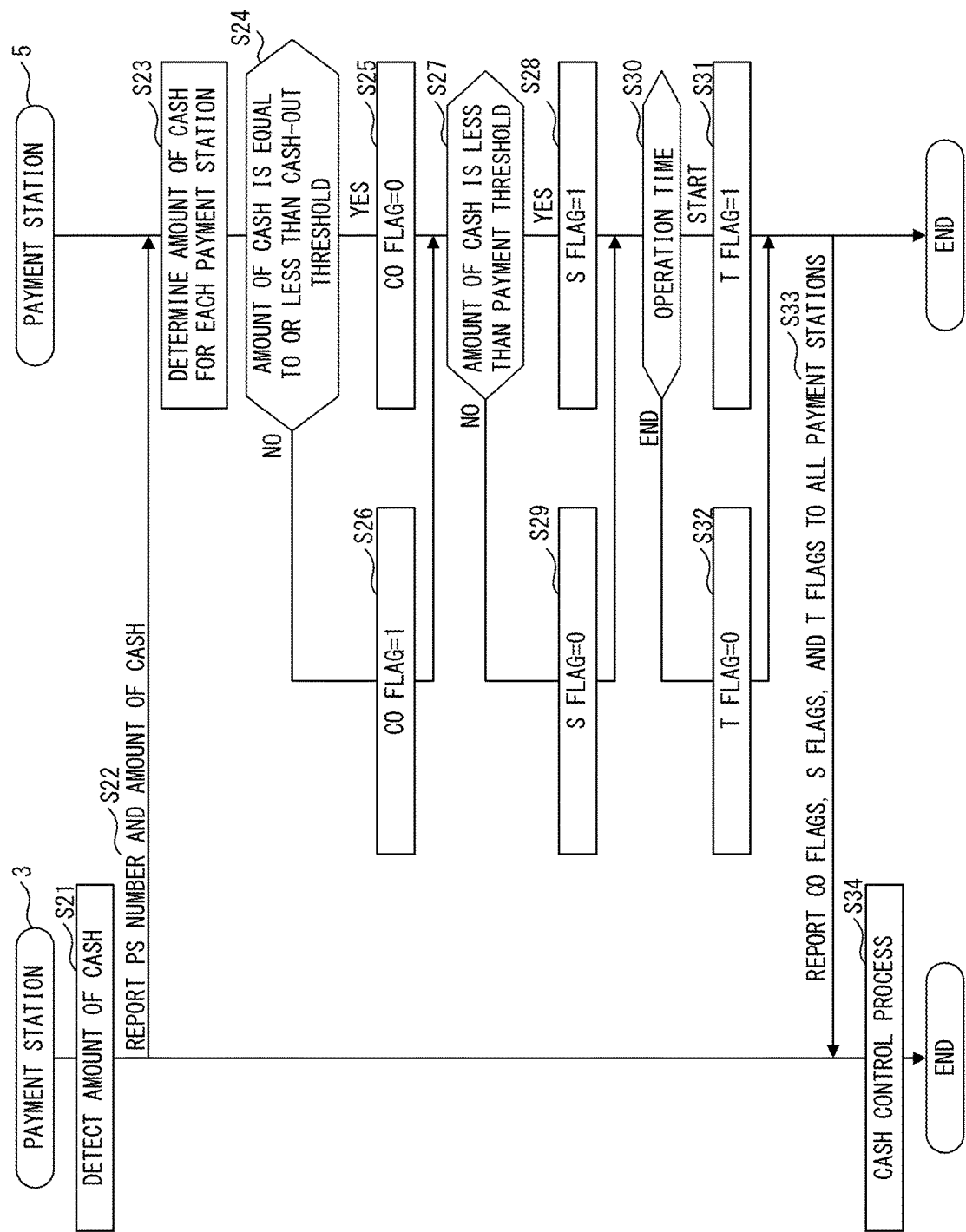
FIG. 11 is a sequence chart illustrating an example of a flag management process.

The following describes a flag management process performed by the payment station 3 and the management server 5. FIG. 11 is a sequence chart illustrating an example of the flag management process.

First, the CPU 70a in the control unit 70 of a payment station 3 detects the amount of cash inserted into or ejected from the payment station 3 (step S21). The CPU 70a reports information on a PS number and the detected amount of cash within the payment station 3 to the management server 5 (step S22).

The CPU 90a in the control unit 90 of the management server 5 stores PS numbers and the amounts of cash reported from payment stations 3 in the PS management table 100 and determines the amounts of cash in the payment stations 3 (step S23).

The CPU 90a determines whether the amount of cash in a payment station 3 is equal to or less than a cash-out threshold (step S24). When the amount of cash in the payment station 3 is equal to or less than the cash-out threshold (YES in step S24), the CPU 90a sets "0" for the cash-out flag (CO) of a corresponding PS number (step S25). When the amount of cash in the payment station 3 is greater than the cash-out threshold (NO in step S24), the CPU 90a sets "1" for the cash-out flag (CO) of the corresponding PS number (step S26).

The CPU 90a determines whether the amount of cash in a payment station 3 is less than a payment threshold (step S27). When the amount of cash in the payment station 3 is less than the payment threshold (YES in step S27), the CPU 90a sets "1" for the payment flag (S) of a corresponding PS number (step S28). When the amount of cash in the payment station 3 is equal to or greater than the payment threshold (NO in step S27), the CPU 90a sets "0" for the payment flag (S) of the corresponding PS number (step S29).

The CPU 90a determines whether the operation time is a start time or an end time (step S30). When the operation time is a start time (step S30: start), the CPU 90a sets "1" for the operation time flag (T) of a corresponding PS number (step S31). When the operation time is an end time (step S30: end), the CPU 90a sets "0" for the operation time flag (T) of the corresponding PS number (step S32).

After performing the processes of steps S23-S32 for the PS numbers of all of the payment stations 3, the CPU 90a reports, to all of the payment stations 3, information on the cash-out flags (CO), the payment flags (S), and the operation time flags (T) that have been set (step S33).

The CPU 70a of a payment station 3 that has received a report of the information on the cash-out flag (CO), the payment flag (S), and the operation time flag (T) from the management server 5 performs a cash control process (described hereinafter) (step S34). When this process is finished, the flag management process ends.

Figure 12:
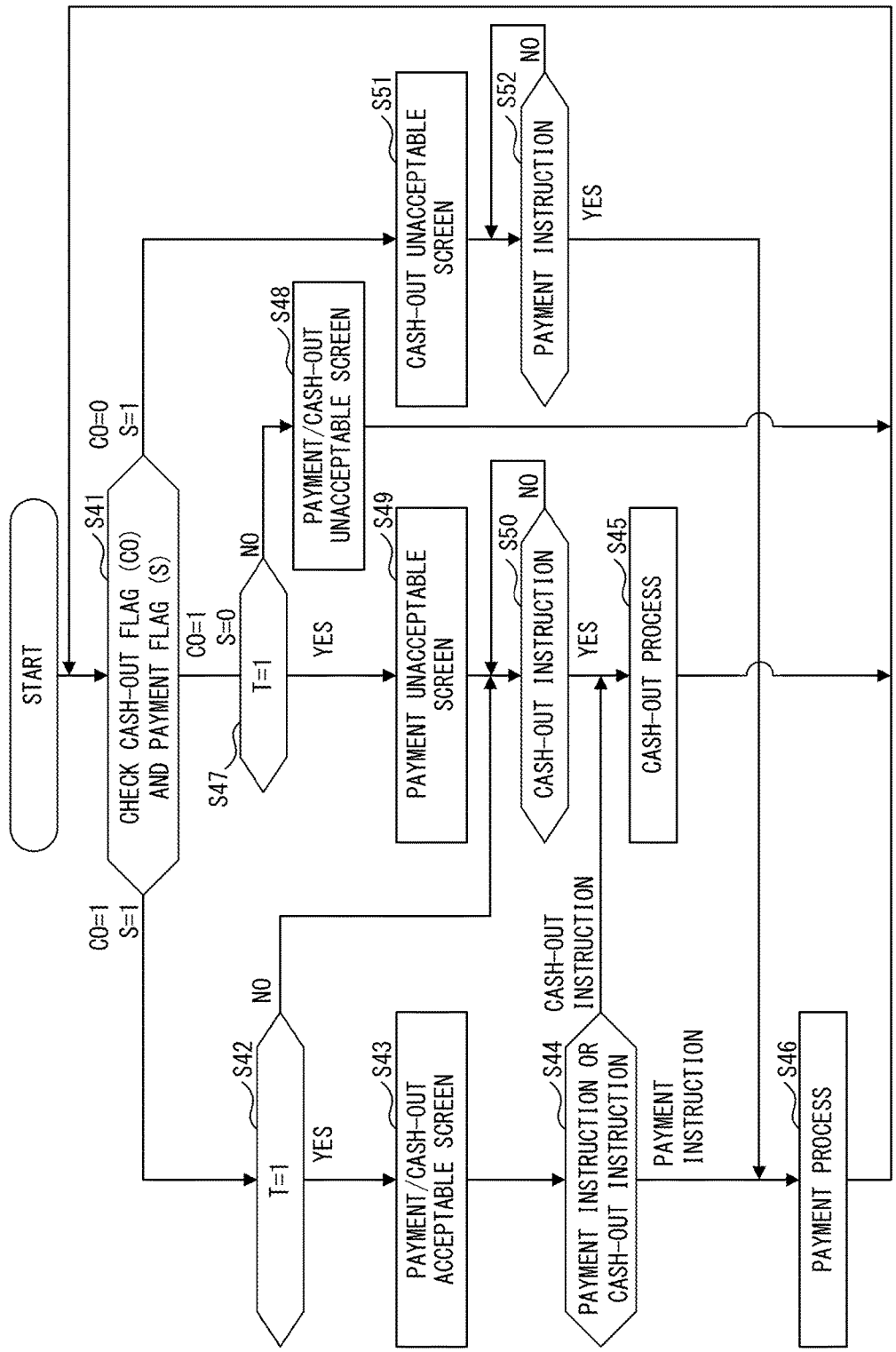
FIG. 12 is a flowchart illustrating an example of a cash control process.

The following describes the cash control process performed by the payment station 3. FIG. 12 is a flowchart illustrating an example of the cash control process.

First, the CPU 70a of a payment station 3 checks, during an idle time, a cash-out flag (CO) and a payment flag (S) reported from the management server 5 (step S41). When cash-out flag (CO)="1" and payment flag (S)="1" are satisfied, i.e., when both the cash-out process and the payment process can be performed, the CPU 70a shifts to a payment/cash-out mode and determines whether operation time flag (T)="1" is satisfied, i.e., whether the current time is in the period of the operation time of the payment station 3 (step S42). When operation time flag (T)="0" is satisfied, i.e., when the current time is not in the period of the operation time of the payment station 3 (NO in step S42), the process shifts to step S50.

When operation time flag (T)="1" is satisfied, i.e., when the current time is in the period of the operation time of the payment station 3 (YES in step S42), the CPU 70a displays a payment/cash-out acceptable guidance screen on the display 71 (step S43).

Figure 13A:
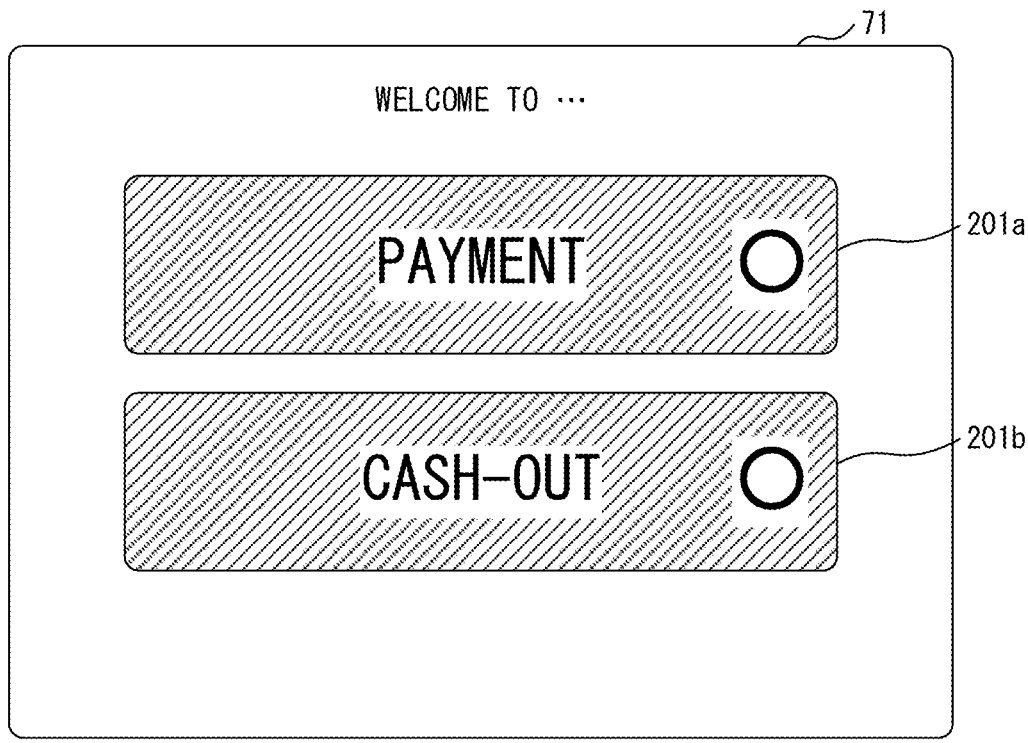
FIGS. 13A and 13B illustrate examples of a payment/cash-out acceptable guidance screen displayed on a display.
Figure 13B:
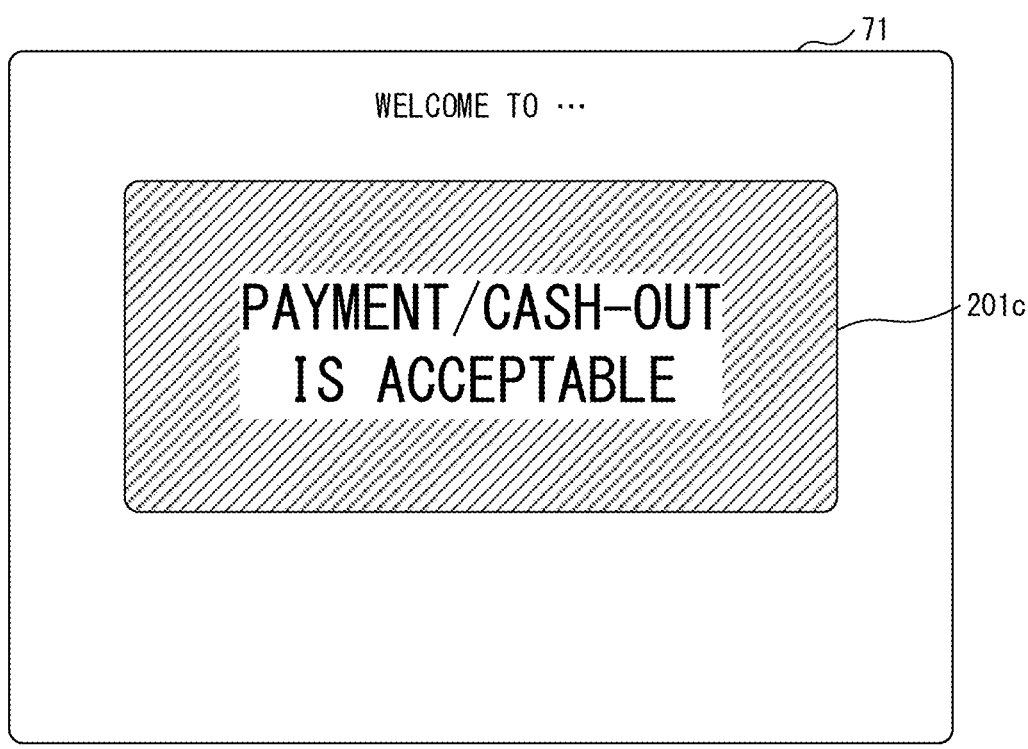

FIGS. 13A and 13B illustrate examples of a payment/cash-out acceptable guidance screen displayed on the display 71. As depicted in FIG. 13A, the CPU 70a causes the display 71 to display, as the payment/cash-out acceptable guidance screen, an icon 201a indicating that payment can be made and an icon 201b indicating that cash-out can be performed. Alternatively, as depicted in FIG. 13B, the CPU 70a may cause the display 71 to display, as the payment/cash-out acceptable guidance screen, a single icon 201c indicating that payment can be made and cash-out can be performed. The CPU 70a may also cause the PATLITE 77 to emit light in blue together with displaying the payment/cash-out acceptable guidance screen, so as to inform a customer of the fact that both payment and cash-out can be performed. In this way, the customer can easily understand that the payment station 3 is currently a terminal with which both payment and cash-out can be performed.

The CPU 70a determines on the basis of a manipulation performed on the touch panel 72 by the customer whether a payment instruction or a cash-out instruction has been accepted (step S44). When a cash-out instruction has been accepted (step S44: cash-out instruction), the CPU 70a performs the cash-out process (described hereinafter) (step S45). Then, the process returns to step S41. When a payment instruction has been accepted (step S44: payment instruction), the CPU 70a performs the payment process (described hereinafter) (step S45). Then, the process returns to step S41.

When cash-out flag (CO)="1" and payment flag (S)="0" are satisfied, i.e., when the cash-out process can be performed but the payment process cannot be performed, the CPU 70a shifts to a cash-out mode and determines whether operation time flag (T)="1" is satisfied, i.e., whether the current time is in the period of the operation time of the payment station 3 (step S47). When operation time flag (T)="0" is satisfied, i.e., when the current time is not in the period of the operation time of the payment station 3 (NO in step S47), the CPU 70a displays a payment/cash-out unacceptable guidance screen on the display 71 (step S48). The payment/cash-out unacceptable guidance screen displays a message that neither the payment process nor the cash-out process can be performed. The CPU 70a may also cause the PATLITE 77 to emit blinking light in red together with displaying the cash-out unacceptable guidance screen, so as to inform a customer of the fact that both payment and cash-out have been restricted. Hence, the customer can easily understand that neither payment nor cash-out can be performed using the payment station 3.

When operation time flag (T)="1" is satisfied, i.e., when the current time is in the period of the operation time of the payment station 3 (YES instep S47), the CPU 70a displays a payment unacceptable guidance screen on the display 71 (step S49).

Figure 14A:
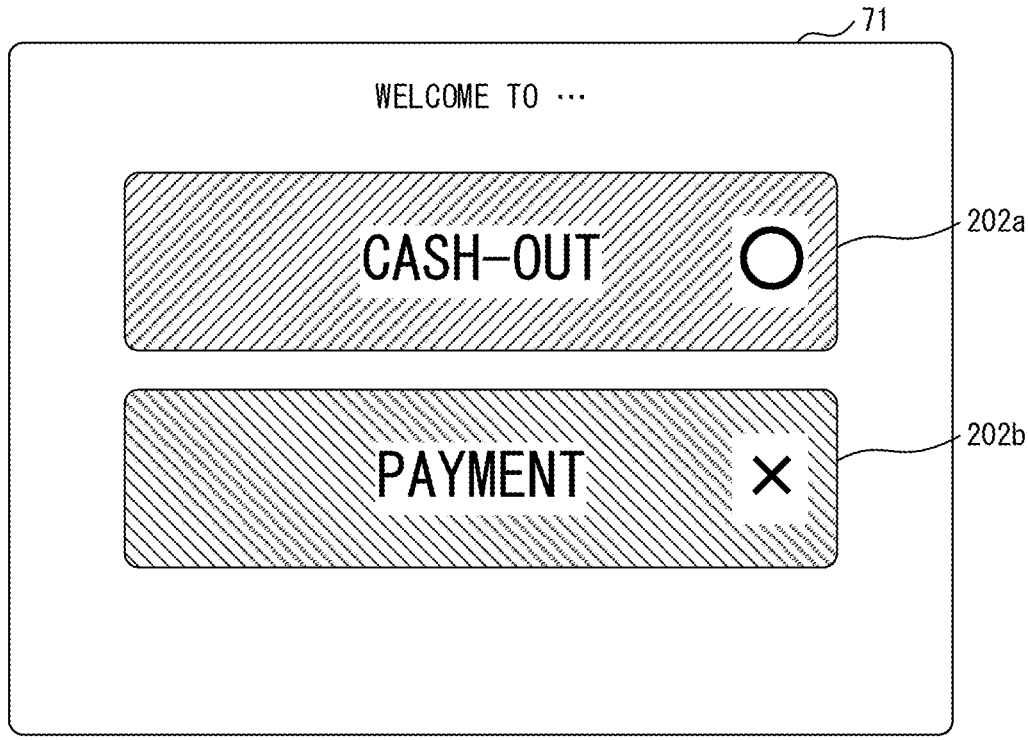
FIGS. 14A and 14B illustrate examples of a payment unacceptable guidance screen displayed on a display.
Figure 14B:
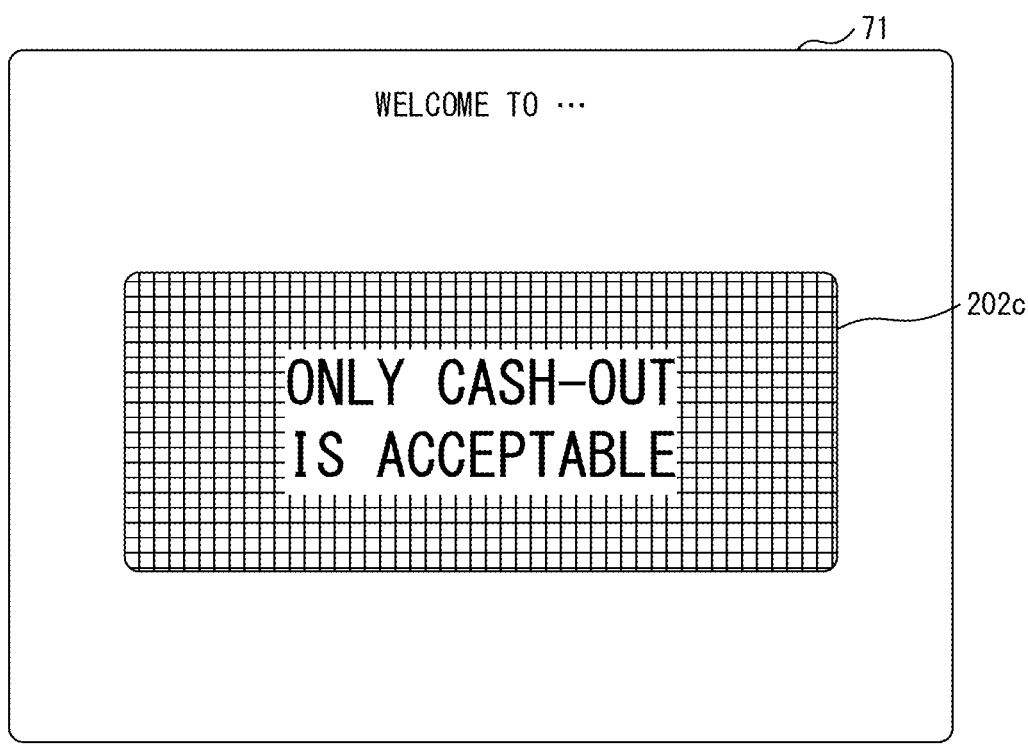

FIGS. 14A and 14B illustrate examples of the payment unacceptable guidance screen displayed on the display 71. As depicted in FIG. 14A, the CPU 70a causes the display 71 to display, as the payment unacceptable guidance screen, an icon 202a indicating that cash-out can be performed and an icon 202b indicating that payment cannot be made. The icon 202a indicating that cash-out can be performed and the icon 202b indicating that payment cannot be made are displayed in different colors. For example, the icon 202a indicating that cash-out can be performed maybe displayed in blue, and the icon 202b indicating that payment cannot be made may be displayed in red. The CPU 70a may also cause the PATLITE 77 to emit light in red together with displaying the payment unacceptable guidance screen, so as to inform a customer of the fact that payment has been restricted. Hence, the customer can easily understand that payment cannot be made using the payment station 3. Alternatively, as depicted in FIG. 14B, the CPU 70a may cause the display 71 to display, as the payment unacceptable guidance screen, a single icon 202c indicating that cash-out can be performed. In this case, the CPU 70a may cause the PATLITE 77 to emit light to inform a customer of the fact that cash-out can be performed.

The CPU 70a determines on the basis of a manipulation performed on the touch panel 72 by the customer whether a cash-out instruction has been accepted (step S50). When a cash-out instruction has not been accepted (NO in step S50), the process is kept in a standby state until a cash-out instruction is accepted. When a cash-out instruction has been accepted (YES in step S50), the CPU 70*a* performs the cash-out process (described hereinafter) (step S45), and the process returns to step S41.

When cash-out flag (CO)="0" and payment flag (S)="1" are satisfied, i.e., when the payment process can be performed but the cash-out process cannot be performed, the CPU 70*a* shifts to the payment mode and causes the display 71 to display the cash-out unacceptable guidance screen (step S51).

Figure 15A:
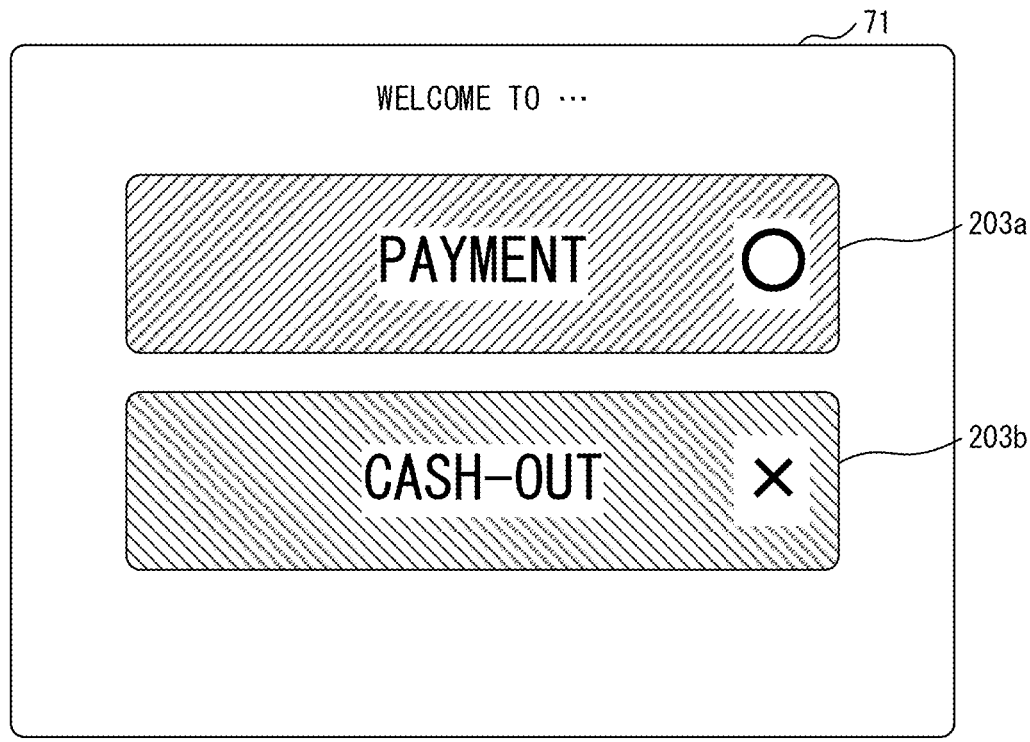
FIGS. 15A and 15B illustrate examples of a cash-out unacceptable guidance screen displayed on a display.
Figure 15B:
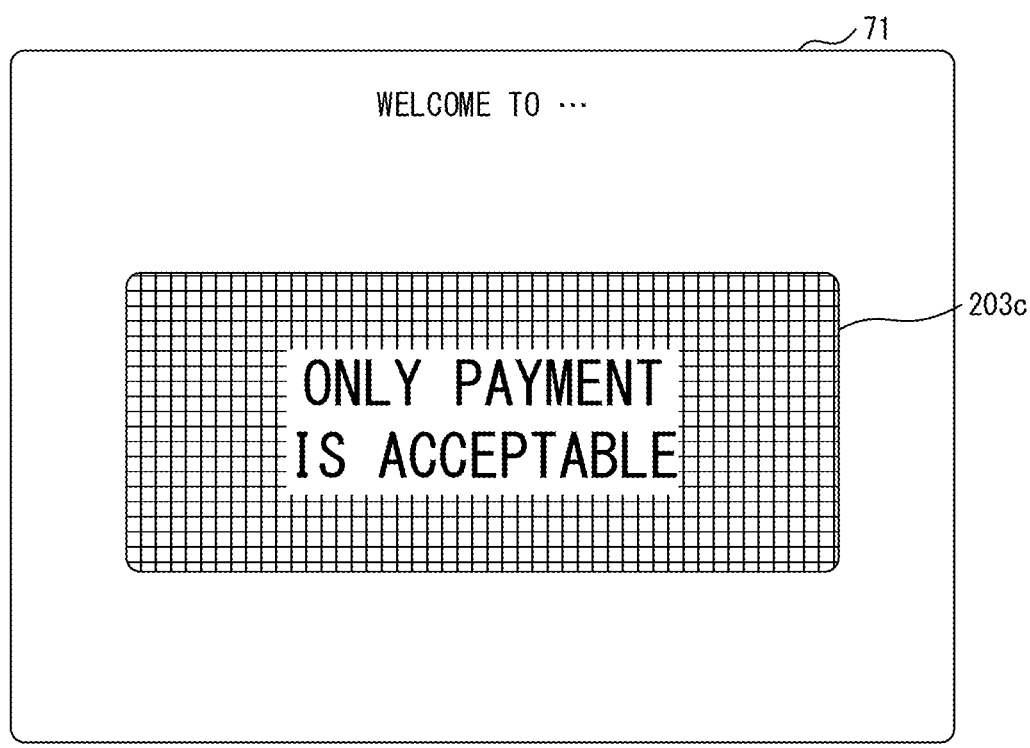

FIGS. 15A and 15B illustrate examples of the cash-out unacceptable guidance screen displayed on the display 71. As depicted in FIG. 15A, the CPU 70*a* causes the display 71 to display, as the cash-out unacceptable guidance screen, an icon 203*a* indicating that payment can be made and an icon 203*b* indicating that cash-out cannot be performed. The icon 203*a* indicating that payment can be made and the icon 203*b* indicating that cash-out cannot be performed are displayed in different colors. For example, the icon 203*a* indicating that payment can be made may be displayed in blue, and the icon 203*b* indicating that cash-out cannot be performed may be displayed in red. The CPU 70*a* may also cause the PATLITE 77 to emit light in yellow together with displaying the cash-out unacceptable guidance screen, so as to inform a customer of the fact that cash-out has been restricted. Hence, the customer can easily understand that cash-out cannot be performed using the payment station 3. Alternatively, as depicted in FIG. 15B, the CPU 70*a* may cause the display 71 to display, as the cash-out unacceptable guidance screen, a single icon 203*c* indicating that payment can be made.

The CPU 70*a* determines on the basis of a manipulation performed on the touch panel 72 by the customer whether a payment instruction has been accepted (step S52). When a payment instruction has not been accepted (NO in step S52), the process is kept in a standby state until a payment instruction is accepted. When a payment instruction has been accepted (YES in step S52), the CPU 70*a* performs the payment process (described hereinafter) (step S46), and the process returns to step S41.

The following describes the cash-out process performed by the payment station 3. FIG. 16 is a flowchart illustrating an example of the cash-out process.

Figure 17:
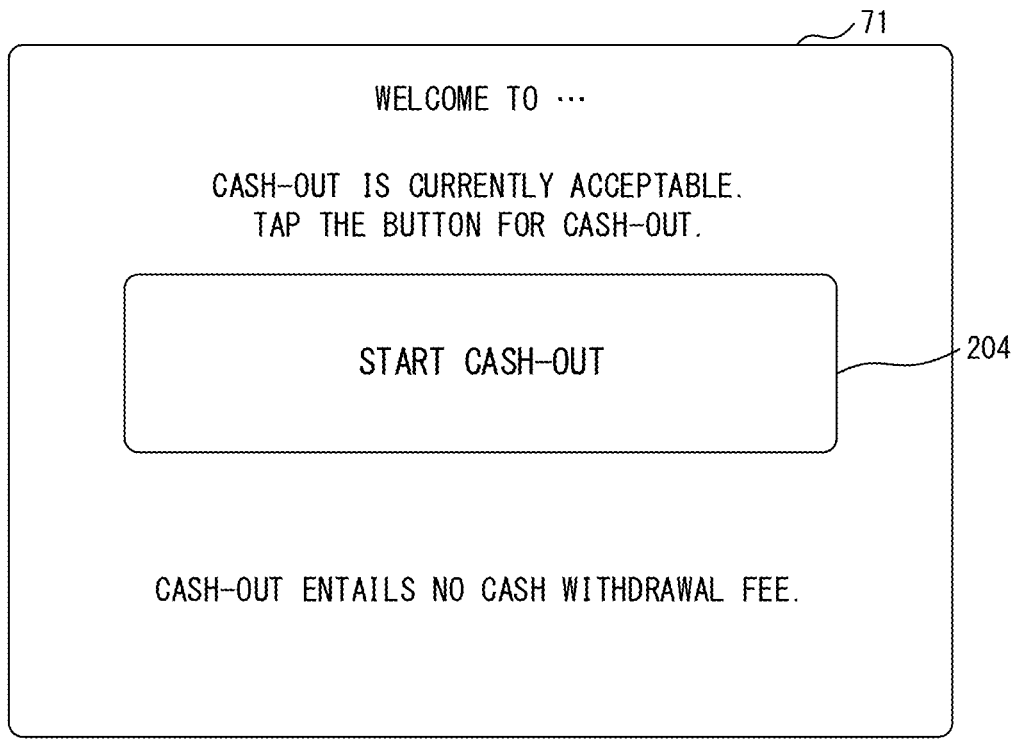
FIG. 17 illustrates an example of a cash-out acceptance screen displayed on a display.

First, the CPU 70*a* in a payment station 3 causes the display 71 to display a cash-out acceptance screen (step S61). FIG. 17 illustrates an example of the cash-out acceptance screen displayed on the display 71. As depicted in FIG. 17, the CPU 70*a* causes the display 71 to display, as the cash-out acceptance screen, an icon 204 indicating that a cash-out process is to be advanced.

The CPU 70*a* determines whether cash-out has been accepted (step S62). In this process, the CPU 70*a* determines on the basis of a manipulation on the touch panel 72 performed by a customer whether the icon 204 displayed on the display 71 has been touched. When cash-out has not been accepted, i.e., when a touch manipulation has not been performed on the icon 204 (NO in step S62), the process is kept on standby until cash-out is accepted. When cash-out has been accepted, i.e., when a touch manipulation has been performed on the icon 204 (YES in step S62), the CPU 70*a* transmits a cash-out start report to the management server 5 (step S63). The CPU 70*a* accepts a cash card on the basis of a manipulation performed by the customer (step S64) and accepts input of a secret identification code (step S65).

The CPU 70*a* causes the display 71 to display the cash-out amount acceptance screen and accepts a cash-out amount (step S66).

FIG. 18 illustrates an example of a cash-out amount acceptance screen displayed on the display 71. The CPU 70*a* causes the display 71 to display, as the cash-out amount acceptance screen, an icon group 205 including icons for a plurality of amounts for selecting a cash-out amount, as depicted in FIG. 18. The CPU 70*a* selects, as a cash-out amount, an amount corresponding to an icon for an amount selected on the basis of a manipulation performed on the touch panel 72 by a customer.

The CPU 70*a* transmits, to the management server 5, authentication information that includes information on an account number included in a cash card, information on a secret identification code, and information on the cash-out amount (step S67). The CPU 70*a* receives an authentication result transmitted from the management server 5 (step S68). The CPU 70*a* determines whether the received authentication result is OK (step S69).

When the authentication result is OK (YES in step S69), the CPU 70*a* ejects as much money as is equal to the cash-out amount accepted in step S66 (step S70). Then, the CPU 70*a* transmits a cash-out finishing report to the management server 5 (step S71). When this process is finished, the cash-out process ends. When the authentication result is NG (NO in step S69), the CPU 70*a* omits the processes of steps S70 and S71 and ends the cash-out process.

The following describes the payment process performed by the payment station 3. FIG. 19 is a flowchart illustrating an example of the payment process.

First, the CPU 70*a* of a payment station 3 determines whether a reservation report has been accepted (step S81). When a reservation report from the management server 5 has not been accepted (NO in step S81), the process is kept on standby until a reservation report is accepted. Upon receipt of a reservation report from the management server 5 (YES in step S81), the CPU 70*a* shifts to a payment mode and displays a payment reservation screen on the display 71 (step S82).

FIG. 20 illustrates an example of the payment reservation screen displayed on the display 71. The CPU 70*a* causes the display 71 to display, as the payment reservation screen as depicted in FIG. 20, a message that the payment station 3 is in use or is scheduled to be used, as the payment station 3 is scheduled to be used for a payment process.

The CPU 70*a* determines on the basis of a manipulation performed on the touch panel 72 by a customer whether a payment instruction has been accepted (step S83). When a payment instruction has not been accepted (NO in step S83), the process is kept on standby until a payment instruction is accepted. When a payment instruction is accepted (YES in step S83), the CPU 70*a* starts the payment process in FIG. 19, transmits, to the POS server 4, a payment start report reporting that the payment process has been started, and accepts a payment amount reported from the POS server 4 (step S85). The CPU 70*a* transmits payment information to the POS server 4 (step S86) and receives a corresponding payment result (step S87).

The CPU 70*a* determines whether the payment result is OK (step S88). When the payment result is OK (YES in step S88), a payment finishing report is transmitted to the management server 5 (step S89). When this process is finished, the payment process ends. When the payment result is NG (NO in step S88), the CPU 70*a* omits the process of step S89 and ends the payment process. In this case, since the payment is not properly finished, an error is reported to the POS server 4.

Figure 21:
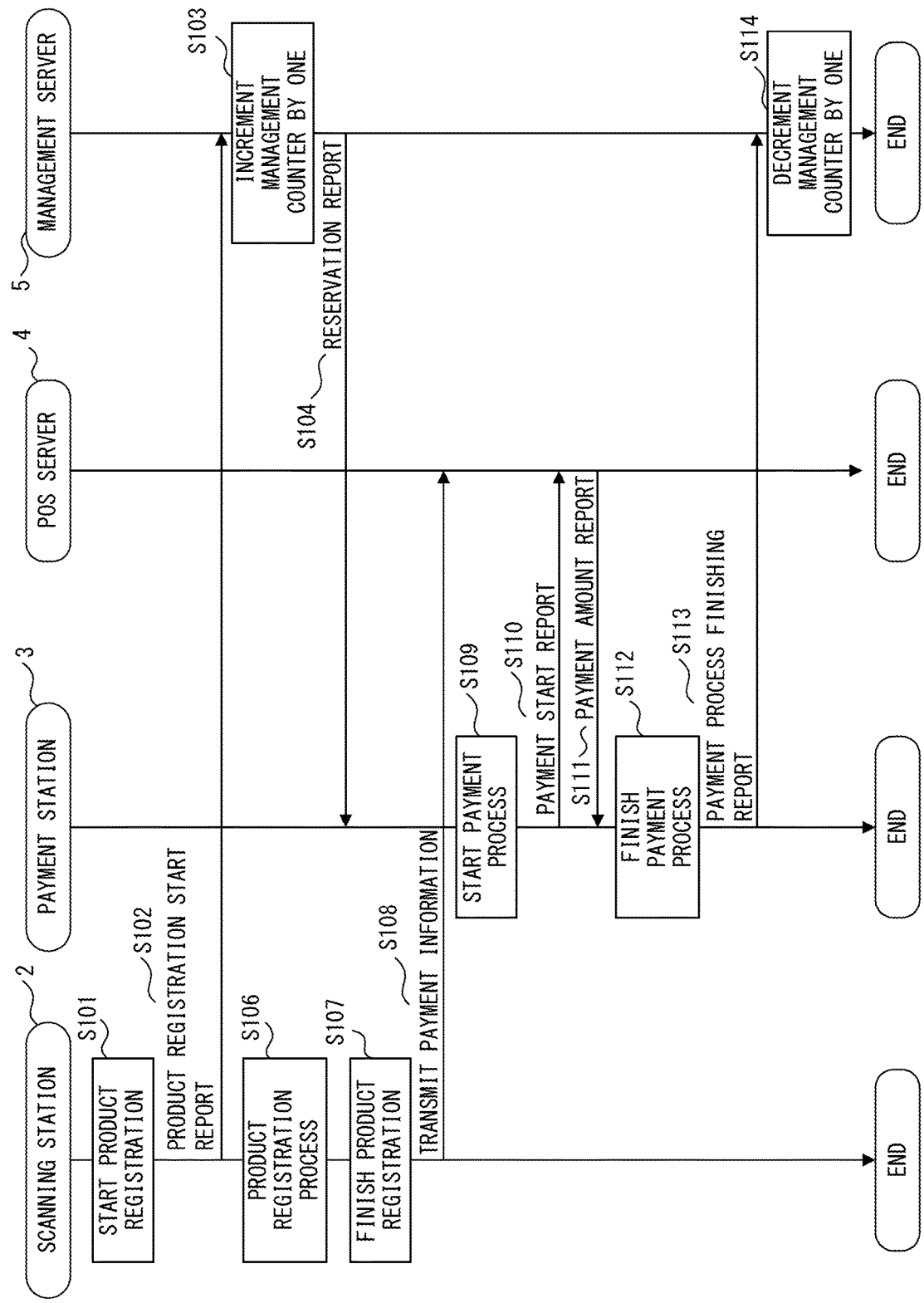
FIG. 21 is a sequence chart illustrating an example of a management counter control process performed upon payment.

The following describes a management counter control process performed by the scanning station 2, the payment station 3, the POS server 4, and the management server 5 upon payment. FIG. 21 is a sequence chart illustrating an example of the management counter control process performed upon payment.

First, upon product registration being started on the basis of a manipulation performed by a store clerk (step S101), the CPU 60*a* of the scanning station 2 transmits a product registration start report to the management servers (step S102). The CPU 90*a* of the management server 5 increments the management counter by one (step S103). The CPU 90*a* transmits a reservation report to the payment station 3 (step S104).

The CPU 60*a* of the scanning station 2 performs a product registration process for registering, as a product for transaction, a product to be purchased, by scanning a bar code presented on the product (step S106). When the product registration process is finished (step S107), the CPU 60*a* transmits payment information to the POS server 4 (step S108).

When a payment process is started (step S109), the CPU 70*a* of the payment station 3 transmits a payment start report to the POS server 4 (step S110) and receives a payment amount report (step S111). Upon the payment process being finished (step S112), the CPU 70*a* transmits a payment process finishing report to the management server 5 (step S113). Upon accepting the payment process finishing report, the CPU 90*a* of the management server 5 decrements the management counter by one (step S114). When this process is finished, the management counter control process performed upon payment ends.

Figure 22:
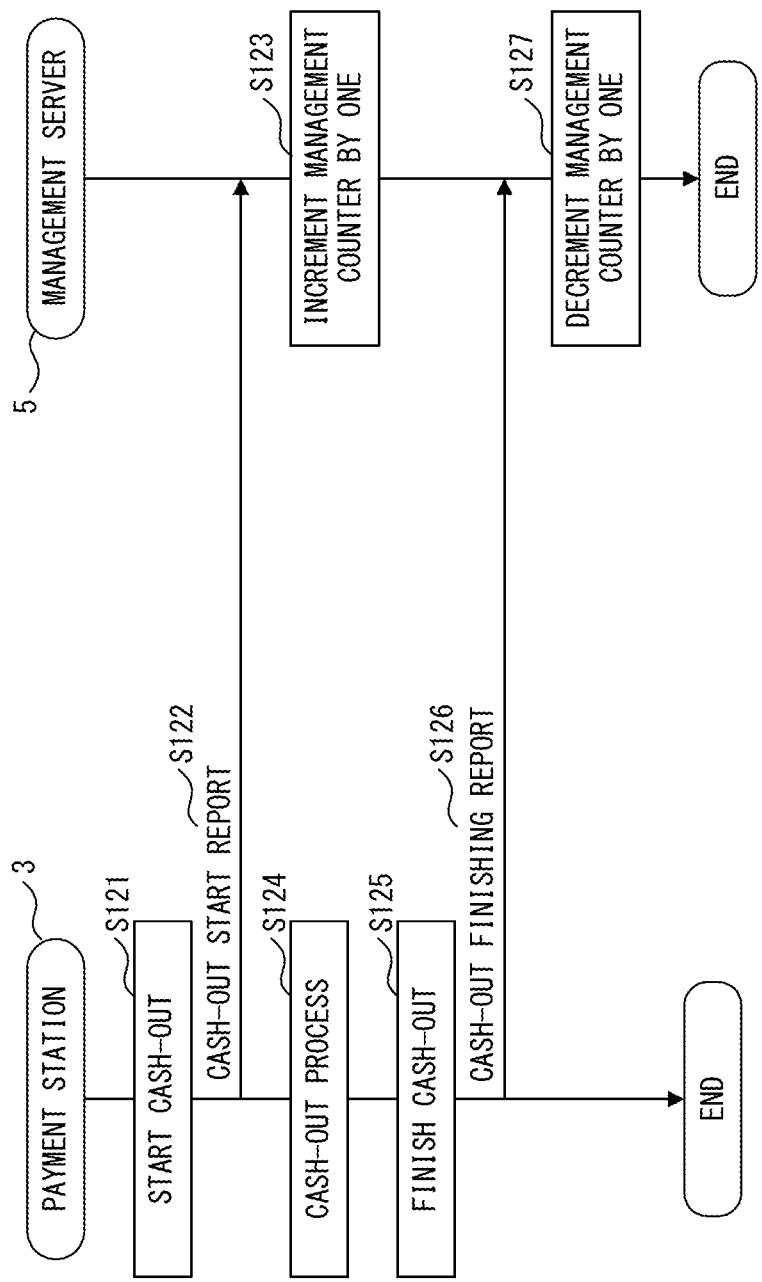
FIG. 22 is a sequence chart illustrating an example of a management counter control process performed upon cash-out.

The following describes a management counter control process performed by the payment station 3 and the management server 5 upon cash-out. FIG. 22 is a sequence chart illustrating an example of the management counter control process performed upon cash-out.

First, upon a cash-out process being started on the basis of a manipulation performed by a customer (step S121), the CPU 70*a* of the payment station 3 transmits a cash-out start report to the management server 5 (step S122). The CPU 90*a* of the management server 5 increments the management counter by one (step S123).

The CPU 70*a* of the payment station 3 performs the cash-out process in FIG. 16 (step S124). Upon the cash-out being finished (step S125), a cash-out finishing report is transmitted to the management server 5 (step S126). Upon the cash-out finishing report being accepted, the CPU 90*a* of the management server 5 decrements the management counter by one (step S127). When this process is finished, the management counter control process performed upon cash-out ends.

The following describes a terminal-count limitation process performed by the management server 5. FIG. 23 is a flowchart illustrating an example of the terminal-count limitation process. The terminal-count limitation process in FIG. 23 and the cash control process in FIG. 12 are performed in parallel.

First, the CPU 90*a* of the management server 5 makes a request for the POS server 4 to report thereto the total number m of payment stations 3 (step S141) and receives the total number m of payment stations 3 transmitted from the POS server 4 (step S142).

The CPU 90*a* determines the value c of the management counter (step S143). The CPU 90*a* determines whether the ratio of the value c of the management counter to the total number m of payment stations 3, i.e., "c/m," is equal to or greater than a terminal limitation threshold (step S144). When the ratio of the value c of the management counter to the total number m of payment stations 3, i.e., "c/m," is equal to or greater than the terminal limitation threshold (YES in step S144), the CPU 90*a* refers to the PS management table 100 in FIG. 3 so as to set the cash-out flag (CO) of a PS number with a cash-out flag (CO) of "1" (ON) to "0" (OFF) (step S145). The process of step S145 is repeatedly performed until the ratio of the value c of the management counter to the total number m of payment stations 3, i.e., "c/m," falls below the terminal limitation threshold.

When the ratio of the value c of the management counter to the total number m of payment stations 3, i.e., "c/m," is less than the terminal limitation threshold (NO in step S144), the CPU 90*a* keeps the processing on standby until a predetermined period of time elapses (step S146). When the predetermined period of time elapses (step S146), the process returns to step S143, and the processes of steps S143-S146 are repeatedly performed.

As described above, the cash processing restriction unit 54 of the management server 5 is configured such that money-insertion acceptance upon payment at a payment station 3 or money-ejection acceptance upon cash-out thereat is restricted in accordance with the amount of cash within the payment station 3. Thus, troubles with cash operations to be performed for the payment stations 3 by store clerks can be reduced, and the costs for store operations can be decreased.

The present invention is not simply limited to the embodiments described herein. Components of the embodiments may be embodied in a varied manner in an implementation phase without departing from the gist of the invention. A plurality of components disclosed with reference to the described embodiments maybe combined, as appropriate, to achieve various inventions. For example, all of the components indicated with reference to embodiments may be combined as appropriate. In addition, components from different embodiments maybe combined as appropriate. In this way, various variations and applications can be provided without departing from the gist of the invention.

In the embodiments described above, the cash amount determination unit 51 determines the amounts of cash within payment stations 3 corresponding to PS numbers on the basis of cash-out thresholds including those for both bills and coins (first threshold). However, the present invention is not limited to this.

For example, the cash amount determination unit 51 may determine the amount of bills among the amount of cash within a payment station 3. When the amount of bills determined by the cash amount determination unit 51 is equal to or less than a cash-out threshold for bills (fourth threshold), i.e., when the cash-out flag (CO) for bills that corresponds to the PS number is "0" (OFF), the cash processing restriction unit 54 may restrict bill-ejection acceptance by the money-ejection acceptance unit 33.

Accordingly, even when there is a shortage of bills in a payment station 3, the desire of a customer wishing to have only a small amount of coins cashed out, such as to obtain money for changing, can be met, thereby improving customer convenience.

For example, the cash amount determination unit 51 may determine the amount of coins among the amount of cash within a payment station 3. When the amount of coins determined by the cash amount determination unit 51 is equal to or less than a cash-out threshold for coins (fifth threshold), i.e., when the cash-out flag (CO) for coins that corresponds to the PS number is "0" (OFF), the cash processing restriction unit 54 may restrict coin-ejection acceptance by the money-ejection acceptance unit 33.

Accordingly, when there is a shortage of coins in a payment station 3, the desire of a customer wishing to have only bills cashed out can be met, thereby improving customer convenience.

The invention claimed is:

1. A self-payment system comprising a product registration terminal that registers a product to be purchased, a payment terminal with which a customer makes payment, and a management apparatus that manages the product registration terminal and the payment terminal, wherein
   the payment terminal includes
   a money-insertion acceptor for accepting insertion of cash upon payment for a product to be purchased that has been registered on a basis of the product registration terminal, and
   a money-ejection acceptor for accepting ejection of cash on the basis of a manipulation performed by a customer on the payment terminal,
   the management apparatus includes a processor configured
   to determines an amount of cash within the payment terminal, to restrict money-insertion acceptance by the money-insertion acceptor of the payment terminal or money-ejection acceptance by the money-ejection acceptor of the payment terminal in accordance with the amount of cash determined by the processor, and
   to count, by means of a management counter, the sum of a number from a start of product registration by the product registration terminal to an end of payment by the payment terminal and a number from a start of money-ejection acceptance by the payment terminal to an end of money ejection, wherein
   when a ratio of a value of the management counter counted by the processor to a total number of payment terminals is equal to or greater than a third threshold, the processor limits a number of payment terminals with the money-ejection acceptor accepting money ejection.

2. The self-payment system of claim 1, wherein
   when the amount of cash determined by the processor is equal to or less than a first threshold, the processor restricts money-ejection acceptance by the money-ejection acceptor.

3. The self-payment system of claim 1, wherein
   when the amount of cash determined by the processor is equal to or greater than a second threshold, the processor restricts money-insertion acceptance by the money-insertion acceptor.

4. The self-payment system of any of claims 1-3, wherein
   the processor determines an operation time of the payment terminal, and
   when the processor determines that a current time is not in a period of the operation time of the payment terminal, the processor restricts money-ejection acceptance by the money-ejection acceptor.

5. The self-payment system of any of claims 1-3, wherein
   the payment terminal further includes a display or a light for informing contents of the payment terminal, and
   the processor performs control for causing the display or the light to inform that money-ejection acceptance by the money-ejection acceptor has been restricted, when the processor has restricted money-ejection acceptance by the money-ejection acceptor.

6. The self-payment system of claim 1, wherein
   the processor determines an amount of bills within the payment terminal, and
   when the amount of bills determined by the processor is equal to or less than a fourth threshold, the processor restricts bill-ejection acceptance by the money-ejection acceptor.

7. The self-payment system of claim 1, wherein
   the processor determines an amount of coins within the payment terminal, and
   when the amount of coins determined by the processor is equal to or less than a fifth threshold, the processor restricts coin-ejection acceptance by the money-ejection acceptor.

* * * * *